US012068767B2

(12) United States Patent
Tanio

(10) Patent No.: US 12,068,767 B2
(45) Date of Patent: Aug. 20, 2024

(54) PARAMETER DETERMINATION APPARATUS, SIGNAL TRANSMISSION APPARATUS, PARAMETER DETERMINATION METHOD, SIGNAL TRANSMISSION METHOD AND PROGRAM RECORDING MEDIUM

(71) Applicant: NEC Corporation, Tokyo (JP)

(72) Inventor: Masaaki Tanio, Tokyo (JP)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 17/466,163

(22) Filed: Sep. 3, 2021

(65) Prior Publication Data

US 2022/0085837 A1 Mar. 17, 2022

(30) Foreign Application Priority Data

Sep. 17, 2020 (JP) ................................ 2020-156218
Aug. 18, 2021 (JP) ................................ 2021-133235

(51) Int. Cl.
    H04B 1/04      (2006.01)
    G06N 3/082     (2023.01)
    H04B 10/50     (2013.01)

(52) U.S. Cl.
    CPC ........... H04B 1/0475 (2013.01); G06N 3/082 (2013.01); H04B 10/50 (2013.01)

(58) Field of Classification Search
    CPC .. H04B 1/0475; H04B 10/2507; H04B 10/50; H04B 2001/0425; G06N 3/082; G06N 20/00; G06N 3/02; G06N 3/049; G06N 3/08; H04L 25/0254
    See application file for complete search history.

(56) References Cited

U.S. PATENT DOCUMENTS

| 5,497,448 A * | 3/1996 | Maruno ................... G06F 18/00 706/31 |
| 5,542,005 A * | 7/1996 | Shimeki .................... G06N 3/04 706/20 |
| 2020/0134772 A1 | 4/2020 | Poudel Karmatha et al. |
| 2020/0395042 A1* | 12/2020 | Hanazawa ............. G06N 3/045 |
| 2022/0019883 A1* | 1/2022 | Veldhoven .......... H03M 1/0626 |
| 2022/0345163 A1* | 10/2022 | Tanio ................... H04B 1/0475 |

FOREIGN PATENT DOCUMENTS

| JP | H09-062644 A | 3/1997 |
| JP | 2002-251601 A | 9/2002 |
| JP | 2020-071862 A | 5/2020 |
| WO | 2019/162990 A1 | 8/2019 |
| WO | WO-2019162990 A1 * | 8/2019 | ........... G06N 3/0454 |

* cited by examiner

Primary Examiner — Hibret A Woldekidan
(74) Attorney, Agent, or Firm — Sughrue Mion, PLLC

(57) ABSTRACT

A parameter determination apparatus adds a third layer between first and second layers of the neural network. The third layer includes a third node not including a non-linear activation function. Outputs of first nodes of the first layer is inputted to the third node The number of the third node of the third layer is smaller than the number of second nodes of the second layer. The parameter determination apparatus further learns a weight between the third and second layers as a part of the parameters and selects, as a part of the parameters, one valid path used as a valid connecting path in the neural network for each second node from connecting paths that connect the third node and the second nodes on the basis of the learned weight.

10 Claims, 11 Drawing Sheets

112 initial 112 learn

PARAMETER DETERMINATION APPARATUS, SIGNAL TRANSMISSION APPARATUS, PARAMETER DETERMINATION METHOD, SIGNAL TRANSMISSION METHOD AND PROGRAM RECORDING MEDIUM

INCORPORATION BY REFERENCE

This application is based upon and claims the benefit of priority from Japanese Patent Application No. 2020-156218, filed on Sep. 17, 2020 and Japanese Patent Application No. 2021-133235, filed on Aug. 18, 2021, the disclosure of which is incorporated herein in its entirety by reference.

TECHNICAL FIELD

Embodiments of the present disclosure relate to a parameter determination apparatus, a parameter determination method and a program recording medium that are configured to determine a parameter of a neural network, and a signal transmission apparatus, a signal transmission method and a program recording medium that are configured to transmit a signal, for example.

BACKGROUND ART

Recently, a utilization of a neural network is studied in various technical fields. For example, in a wireless communication system such as a mobile communication system, a distortion compensation apparatus in a DPD (Digital Pre-Distortion) type is built by using a neural network.

Note that a Patent Literature 1 to a Patent Literature 4 are cited as related documents related to the present disclosure.

RELATED DOCUMENTS

Patent Literature

[Patent Literature 1] WO2019/162990A1;
[Patent Literature 2] JP2020-071862A;
[Patent Literature 3] JP2002-251601A;
[Patent Literature 4] JPH09-062644A;

SUMMARY OF INVENTION

An apparatus that is build by using the neural network has such a technical problem that a processing amount (namely, a calculation amount) is relatively large due to a complication of a network structure of the neural network. Thus, it is desired to build a neural network that requires a relatively small processing amount.

In view of the problems described above, it is therefore an example object of the present disclosure to provide a parameter determination apparatus, a parameter determination method, a signal transmission apparatus, a signal transmission method and a program recording medium that can solve the technical problems described above. As one example, the example object of the present disclosure is to provide a parameter determination apparatus, a parameter determination method and a program recording medium that are configured to build a neural network that requires a relatively small processing amount, and a signal transmission apparatus, a signal transmission method and a program recording medium that are configured to transmit a signal by using a neural network that requires a relatively small processing amount.

A parameter determination apparatus according to an example aspect of the invention is a parameter determination apparatus that determines parameters of a neural network, the parameter determination apparatus includes a controller, the controller is configured to: add a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer; learn a weight between the third layer and the second layer as a part of the parameters; and select, as a part of the parameters, one valid path that is used as a valid connecting path in the neural network for each second node from a plurality of connecting paths that connect the third node and the plurality of second nodes on the basis of the learned weight.

A signal transmission apparatus according to an example aspect of the invention is a signal transmission apparatus that includes: a distortion compensator that is configured to perform a distortion compensation on an input signal by using a neural network to generate a distortion compensation signal; and a signal generator that is configured to perform a predetermined operation on the distortion compensation signal to generate a transmission signal that is transmitted to a signal reception apparatus, the neural network includes: a first layer that is an input layer or a hidden layer; a second layer that is a hidden layer or an output layer; and a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer, an output of single third node is inputted to each of the plurality of second nodes.

A parameter determination method according to an example aspect of the invention is a parameter determination method of determining parameters of a neural network, the parameter determination method includes: adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer; learning a weight between the third layer and the second layer as a part of the parameters; and selecting, as a part of the parameters, one valid path that is used as a valid connecting path in the neural network for each second node from a plurality of connecting paths that connect the third node and the plurality of second nodes on the basis of the learned weight.

A signal transmission method according to an example aspect of the invention is a signal transmission method that includes: performing a distortion compensation on an input signal by using a neural network to generate a distortion compensation signal; and performing a predetermined operation on the distortion compensation signal to generate a transmission signal that is transmitted to a signal reception apparatus, the neural network includes: a first layer that is an input layer or a hidden layer; a second layer that is a hidden layer or an output layer; and a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer, an output of single third node is inputted to each of the plurality of second nodes.

A first program recording medium according to an example aspect of the invention is a non-transitory program recording medium on which a computer program is recorded, the computer program allows a computer to execute a parameter determination method of determining parameters of a neural network, the parameter determination method includes: adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer; learning a weight between the third layer and the second layer as a part of the parameters; and selecting, as a part of the parameters, one valid path that is used as a valid connecting path in the neural network for each second node from a plurality of connecting paths that connect the third node and the plurality of second nodes on the basis of the learned weight.

A second program recording medium according to an example aspect of the invention is a non-transitory program recording medium on which a computer program is recorded, the computer program allows a computer to execute a signal transmission method, the signal transmission method includes: performing a distortion compensation on an input signal by using a neural network to generate a distortion compensation signal; and performing a predetermined operation on the distortion compensation signal to generate a transmission signal that is transmitted to a signal reception apparatus, the neural network includes: a first layer that is an input layer or a hidden layer; a second layer that is a hidden layer or an output layer; and a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer, an output of single third node is inputted to each of the plurality of second nodes.

EXAMPLE EMBODIMENTS

Next, with reference to the drawings, an example embodiment of a parameter determination apparatus, a parameter determination method, a signal transmission apparatus, a signal transmission method and a program recording medium will be described.

<1> Signal Transmission Apparatus 1

Figure 1:
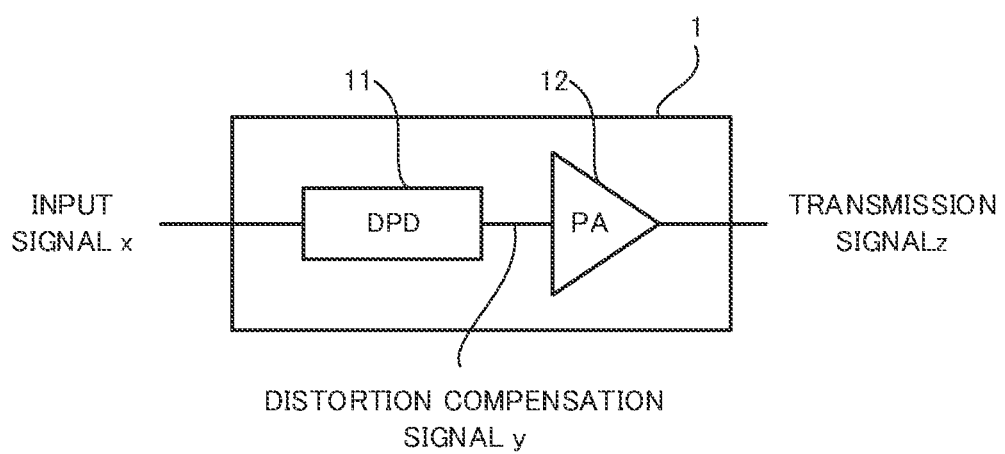
FIG. 1 is a block diagram that illustrates a configuration of a signal transmission apparatus in an example embodiment.

Firstly, with reference to FIG. 1, a signal transmission apparat 1 in the example embodiment will be described. FIG. 1 is a block diagram that illustrates a configuration of the signal transmission apparat 1 in the example embodiment.

As illustrated in FIG. 1, the signal transmission apparatus 1 transmits a transmission signal z to a non-illustrated signal reception apparatus through a communication line. The communication line is typically a wireless communication line, however, at least a part thereof may be a wired communication line. In order to transmit the transmission signal z, the signal transmission apparatus 1 is provided with a distortion compensation circuit (DPD: Digital Pre-Distortion) 11 and a power amplifier (PA) 12.

The distortion compensation circuit 11 performs a distortion compensation on an input signal x to generate a distortion compensation signal y. The distortion compensation circuit 11 performs, on the input signal x, the distortion compensation for compensating (typically, reducing or canceling) a distortion that is generated in the transmission signal z due to an operation of the power amplifier 12 to generate the distortion compensation signal y. In the example embodiment, the distortion compensation circuit 11 may be a distortion compensation apparatus in a DPD type, for example. Especially, the distortion compensation circuit 11 may generate the distortion compensation signal y obtained by reflecting an inverse distortion characteristic of the power amplifier 12 on the input signal x. In this case, it is possible to achieve both of a reduction of an electrical power consumption and a reduction of a distortion of the signal transmission apparatus 1. Specifically, it is possible to achieve both of an improvement of an efficiency of the signal transmission apparatus 1 and a securement of a linearity of an amplification characteristic of the signal transmission apparatus 1.

The power amplifier 12 performs a predetermined operation on the distortion compensation signal y outputted from the distortion compensation circuit 11. Specifically, the power amplifier 12 amplifies the distortion compensation signal y. The distortion compensation signal y amplified by the power amplifier 12 is transmitted, as the transmission signal z, to the signal reception apparatus through the communication line. Here, when the distortion compensation circuit 11 is the distortion compensation apparatus in the DPD type as described above, the power amplifier 12 outputs the transmission signal z that is linear with respect to the input signal x, because the distortion of the signal in the power amplifier 12 is cancelled by the inverse distortion of the signal in the distortion compensation circuit 11.

Figure 2:
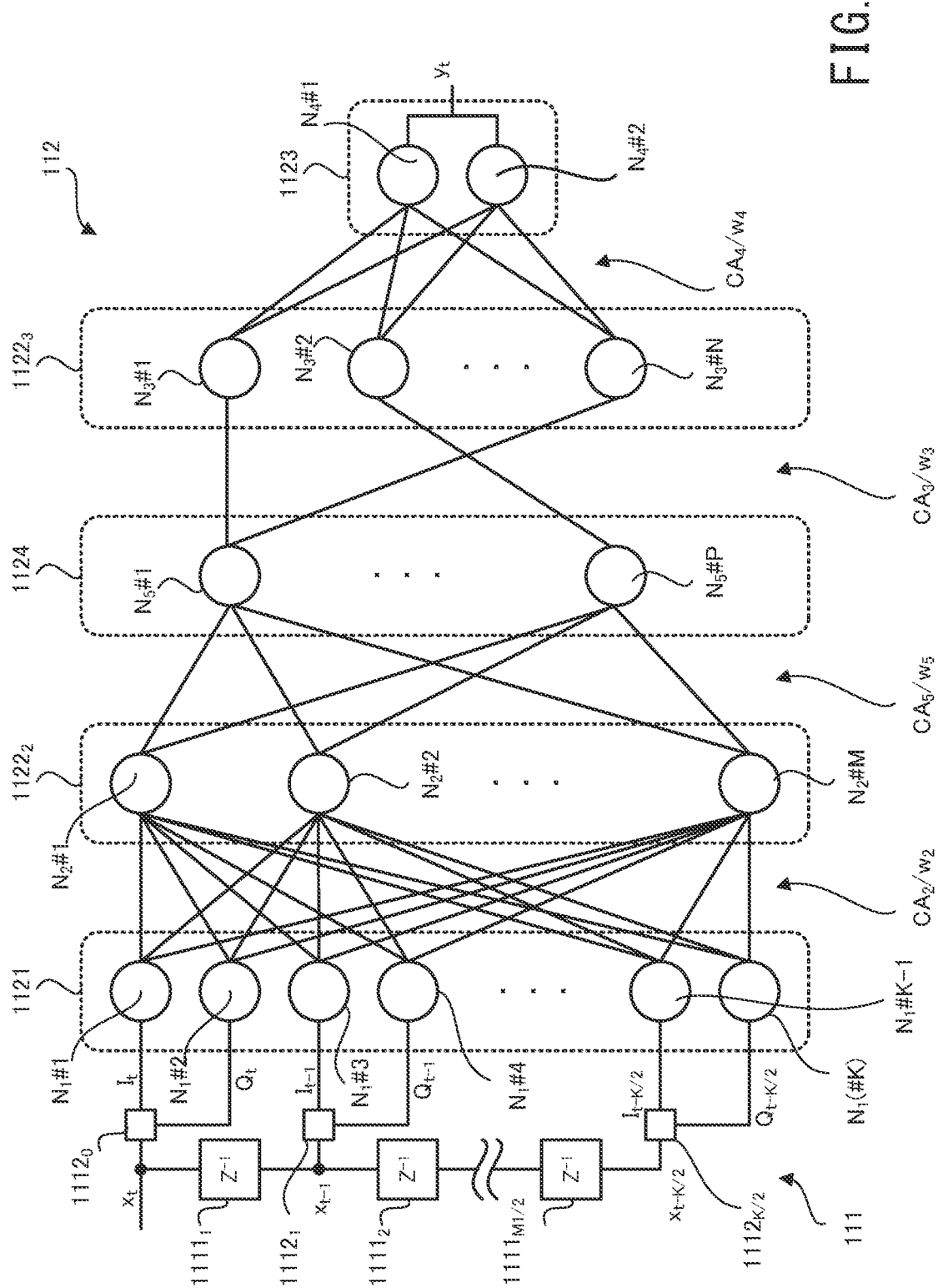
FIG. 2 is a block diagram that illustrates a configuration of a distortion compensation circuit.

Especially in the example embodiment, the distortion compensation circuit 11 performs the distortion compensation on the input signal x by using a neural network 112 (see FIG. 2). Next, a configuration of the distortion compensation circuit 11 will be further described in detail with reference to FIG. 2. FIG. 2 is a block diagram that illustrates the configuration of the distortion compensation circuit 11.

As illustrated in FIG. 2, the distortion compensation circuit 11 is provided with a signal generating unit 111 and the neural network 112.

The signal generating unit 111 generates, from an input signal $x_t$ inputted to the distortion compensation circuit 11, a plurality of signals (typically, a plurality of signals to which different delays are added, respectively) that are inputted to the neural network 112. Note that the input signal $x_t$ means a complex signal of the input signal x that is inputted to the distortion compensation circuit 11 at a time t.

The signal generating unit 111 may generate the plurality of signals by using any method, as long as the signal generating unit 111 generates, from the input signal $x_t$, the plurality of signals that are inputted to the neural network 112. In an example illustrated in FIG. 2, the signal generating unit 111 generates an input signal $x_{t-1}$ to an input signal $x_{t-K/2}$, on the basis of the input signal $x_t$. Note that a variable number K represents the total number of a node (namely, a neuron) $N_1$ that is included in a below described input layer 1121 of the neural network 112, and the variable number K is an integer that is equal to or larger than 1. A symbol "/" means a division (the same is applied to the below described description). In order to generate the input signal $x_{t-1}$ to the input signal $x_{t-K/2}$, on the basis of the input signal $x_t$, the signal generating unit 111 is provided with a delay circuit 1111 the number of which is K/2. Specifically, the signal generating unit 111 is provided with a delay circuit $1111_1$ to a delay circuit $1111_{K/2}$. The delay circuit $1111h$ (note that a variable number h is an integer that is equal to or larger than 1 and that is equal to or smaller than K/2) adds a delay to the input signal $x_{t-h+1}$ to generate the input signal $x_{t-h}$. Moreover, the signal generating unit 111 generates, from the input signal $x_{t-g}$ (note that a variable number g is an integer that is equal to or larger than 0 and that is equal to or smaller than K/2), an input signal $I_{t-g}$ that corresponds to an I axis signal component of the input signal $x_{t-g}$ and an input signal $Q_{t-g}$ that corresponds to a Q axis signal component of the input signal $x_{t-g}$. The I axis signal component of the input signal $x_{t-g}$ corresponds to an in-phase signal component of a waveform of the input signal $x_{t-g}$. The Q axis signal component of the input signal $x_{t-g}$ corresponds to a quadrature component of the waveform of the input signal $x_{t-g}$. In order to generate the input signals $I_{t-g}$ and $Q_{t-g}$ from the input signal $x_{t-g}$, the signal generating unit 111 is provided with a signal converter 1112 the number of which is K/2+1. Specifically, the signal generating unit 111 is provided with a signal converter $1112_0$ to a signal converter $1112_{K/2}$. The signal converter $1112_g$ generate the input signals $I_{t-g}$ and $Q_{t-g}$ from the input signal $x_{t-g}$. As a result, the input signals $I_t$ to $I_{t-K/2}$ and the input signals $Q_t$ to $Q_{t-K/2}$ are inputted to the neural network 112.

Note that the signal generating unit 111 may generate the input signal $x_{t-1}$ to the input signal $x_{t-K}$ on the basis of the input signal $x_{t-g}$ and input amplitude values of the generated input signal $x_t$ to the input signal $x_{t-K}$ to the neural network 112. Moreover, the signal generating unit 111 may mix the amplitude values of the input signal $x_t$ to the input signal $x_{t-K}$, the input signal $I_t$ to the input signal $I_{t-K}$ and the input signal $Q_t$ to the input signal $Q_{t-K}$ and input them to the neural network 112. The signal generating unit 111 may input a value (for example, an exponential value and the like) calculated by using the amplitude values of the input signal $x_t$ to the input signal $x_{t-K}$, the input signal $I_t$ to the input signal $I_{t-K}$ and the input signal $Q_t$ to the input signal $Q_{t-K}$ to the neural network 112.

The neural network 112 generates a distortion signal $y_t$ (namely, the input signal $x_t$ on which the distortion compensation is already performed) on the basis of the input signal $I_t$ to the input signal $I_{t-K/2}$ and the input signal $Q_t$ to the input signal $Q_{t-K/2}$. The neural network 112 is provided with the input layer 1121, at least one hidden layer (namely, a middle layer) 1122, an output layer 1123 and at least one linear layer 1124. In the below described description, an example in which the neural network 112 is provided with adjacent two hidden layers 1122 (specifically, the hidden layer $1122_2$ and the hidden layer $1122_3$) and one linear layer 1124 disposed between the adjacent two hidden layers 1122 (namely, between two hidden layers 1122 that have such a relationship that an output of one hidden layer 1122 is inputted to the other hidden layer 1122 when the linear layer 1124 does not exist, and specifically, the hidden layer $1122_2$ and the hidden layer $1122_3$) will be described for the purpose of clear description, as illustrated in FIG. 2. However, the neural network 112 may be provided with one hidden layer 1122 or three or more hidden layers 1122. The neural network 112 may be provided with two or more linear layers 1124. The neural network 112 may be provided with the linear layer 1124 that is disposed between the input layer 1121 and the hidden layer 1122 that is adjacent to the input layer 1121 (namely, the hidden layer 1122 to which an output of the input layer 1121 is inputted when the linear layer 1124 does not exist, and the hidden layer $1122_2$ in the example illustrated in FIG. 2). The neural network 112 may be provided with the linear layer 1124 that is disposed between the output layer 1123 and the hidden layer 1122 that is adjacent to the output layer 1123 (namely, the hidden layer 1122 an output of which is inputted to the output layer 1123 when the linear layer 1124 does not exist, and the hidden layer $1122_3$ in the example illustrated in FIG. 2).

The input layer 1121 is provided with a node $N_1$ the number of which is K. In the below described description, the K nodes $N_1$ are referred to as a node $N_1$ #1 to a node $N_1$ #K to distinguish them. The variable number K is typically an integer that is equal to or larger than 2. The hidden layer $1122_2$ is a layer to which the output of the input layer 1121 is inputted. The hidden layer $1122_2$ is provided with a node $N_2$ the number of which is M. In the below described description, the M nodes $N_2$ are referred to as a node $N_2$ #1 to a node $N_2$ #M to distinguish them. A constant number M is typically an integer that is equal to or larger than 2. The hidden layer $1122_3$ is a layer to which the output of the linear layer 1124 is inputted. The hidden layer $1122_3$ is provided with a node $N_3$ the number of which is N. In the below described description, the N nodes $N_3$ are referred to as a node $N_3$ #1 to a node $N_3$ #N to distinguish them. A constant number N is typically an integer that is equal to or larger than 2. The output layer 1123 is a layer to which the output of the hidden layer $1122_3$ is inputted. The output layer 1123 is provided with a node $N_4$ the number of which is O. In the below described description, the O nodes $N_4$ are referred to as a node $N_4$ #1 to a node $N_4$ #O to distinguish them. A constant number O is typically an integer that is equal to or larger than 2, however, may be 1. In the example illustrated in FIG. 2, the constant number O is 2 and the output layer 1123 is provided with the nodes $N_4$ #1 and $N_4$ #2. The linear layer 1124 is a layer to which the output of the hidden layer $1122_2$ is inputted. The linear layer 1124 is provided with a node $N_5$ the number of which is P. In the below described description, the P nodes $N_5$ are referred to as a node $N_5$ #1 to a node $N_5$ #P to distinguish them. A constant number P is typically an integer that is equal to or larger than 2. Moreover, the constant number P is smaller than the above described constant number N. Namely, the number of the node $N_5$ of the linear layer 1124 is smaller than the number of the node $N_3$ of the hidden layer $1122_3$ to which the output of the linear layer 1124 is inputted.

The input signal $I_t$ to the input signal $I_{t-K/2}$ and the input signal $Q_t$ to the input signal $Q_{t-K/2}$ are inputted to the node $N_1$ #1 to the node $N_1$ #K of the input layer 1121, respectively. In the example illustrated in FIG. 2, when k (note that k is a variable number that represents an integer satisfying 1≤k≤K) is an odd number, the input signal $I_{t-(k-1)/2}$ is inputted to the k-th node $N_1$ #k of the input layer 1121. When k is an even number, the input signal $Q_{t-(k-2)/2}$ is inputted to the k-th node $N_1$ #k of the input layer 1121. An output $H_1$ #k of the k-th node $N_1$ #k may be same as the input to the k-th node $N_1$ #k. Alternatively, the output $H_1$ #k of the k-th node $N_1$ #k may be represented by an equation 1. "real (x)" in the equation 1 is a function that outputs a real number component of the complex input signal x, and "imag (x)" in the equation 1 is a function that outputs an imaginary number component of the complex input signal x. The output $H_1$ #k of the k-th node $N_1$ #k of the input layer 1121 is inputted to each of the node $N_2$ #1 to node $N_2$ #M through M connecting paths that connect the k-th node $N_1$ #k of the input layer 1121 and the node $N_2$ #1 to node $N_2$ #M of the hidden layer $1122_2$, respectively. Note that the variable number k in the equation 1 represents an integer that is equal to or larger than 1 and that is equal to or smaller than K/2, exceptionally.

$$H_1 \# k = \text{real}(x_{t-k+1}),$$
$$H_1 \#\left(k + \frac{K}{2}\right) = \text{imag}(x_{t-k+1})$$
[equation 1]

An output $H_2$ #m of the m-th node $N_2$ #m (note that m is a variable number that represents an integer satisfying 1≤m≤M) of the hidden layer $1122_2$ is represented by an equation 2. "$w_2(k,m)$" in the equation 2 represents a weight in a connecting path between the k-th node $N_1$ #k of the input layer 1121 and the m-th node $N_2$ #m of the hidden layer $1122_2$. "$b_2(m)$" in the equation 2 represents a bias that is used (namely, added) in the m-th node $N_2$ #m of the hidden layer $1122_2$. "f" in the equation 2 represents an activation function. A non-linear activation function may be used as the activation function, for example. A sigmoid function or a ReLu (Rectified Linear Unit) function may be used as the non-linear activation function, for example. The output $H_2$ #m of the m-th node $N_2$ #m of the hidden layer $1122_2$ is inputted to each of the node $N_2$ #1 to node $N_5$ #P through P connecting paths that connect the m-th node $N_2$ #m of the hidden layer $1122_2$ and the node $N_5$ #1 to node $N_5$ #P of the linear layer 1124, respectively.

$$H_2 \# m = f\left(\left(\sum_{k=1}^{K} H_1 \# k \times w_2(k, m)\right) + b_2(m)\right)$$
[equation 2]

An output $H_5$ #p of the p-th node $N_5$ #p (note that p is a variable number that represents an integer satisfying 1≤p≤P) of the linear layer 1124 is represented by an equation 3. "$w_5(m,p)$" in the equation 3 represents a weight in a connecting path between the m-th node $N_2$ #m of the hidden layer $1122_2$ and the p-th node $N_5$ #p of the linear layer 1124. As illustrated in the equation 3, each node $N_5$ of the linear layer 1124 is a node that does not include the non-linear activation function. Namely, each node $N_5$ of the linear layer 1124 is a node that outputs a linear sum of the outputs $H_2$ #1 to $H_2$ #M of the hidden layer $1122_2$. Moreover, each node $N_5$ of the linear layer 1124 is a node that does not add the bias. The output $H_5$ #p of the p-th node $N_5$ #p of the linear layer 1124 is inputted to at least one of the node $N_3$#1 to node $N_3$ #N through at least one of N connecting paths that connect the p-th node $N_5$ #p of the linear layer 1124 and the node $N_3$ #1 to node $N_3$ #N of the hidden layer $1122_3$, respectively.

$$H_5 \# p = \sum_{m=1}^{M} H_2 \# m \times w_5(m, p)$$
[equation 3]

Either one of the outputs $H_5$ #1 to $H_5$ #P of the linear layer 1124 is inputted to each node $N_3$ of the hidden layer $1122_3$. Specifically, to each node $N_3$ of the hidden layer $1122_3$, either one of the outputs $H_5$ #1 to $H_5$ #P is inputted and the other of the outputs $H_5$ #1 to $H_5$ #P, which does not include one output that is inputted to each node $N_3$, is not inputted. In this case, either one of P connecting paths that connect the node $N_5$ #1 to node $N_5$ #P of the linear layer 1124 and each node $N_3$ of the hidden layer $1122_3$, respectively, is used as a connecting path that validly (in other words, actually) connects the linear layer 1124 and the hidden layer $1122_3$. This connecting path is referred to as a "valid path". In other words, either one of P connecting paths that connect the node $N_5$ #1 to node $N_5$ #P of the linear layer 1124 and each node $N_3$ of the hidden layer $1122_3$, respectively, is used as a valid connecting path (namely, the valid path) in the neural network 112. Namely, each node $N_3$ of the hidden layer $1122_3$ is connected to either one of the node $N_5$ #1 to node $N_5$ #P of the linear layer 1124 through one valid path. In other words, either one of the outputs $H_5$ #1 to $H_5$ #P of the linear layer 1124 is inputted to each node $N_3$ of the hidden layer $1122_3$ through one valid path. On the other hand, residual P−1 connecting path, which does not include the valid path, of the P connecting paths that connect the node $N_5$ #1 to node $N_5$ #P of the linear layer 1124 and each node $N_3$ of the hidden layer $1122_3$, respectively, is not used as the valid path that actually connects the linear layer 1124 and the hidden layer $1122_3$. In other words, residual P−1 connecting path, which does not include the valid path, of the P connecting paths that connect the node $N_5$ #1 to node $N_5$ #P of the linear layer 1124 and each node $N_3$ of the hidden layer $1122_3$, respectively, is not used as the valid connecting path in the neural network 112.

When the output $H_5$ #p of the p-th node $N_5$ #p of the linear layer 1124 is inputted to the n-th node $N_3$ #n of the hidden layer $1122_3$ (namely, the p-th node $N_5$ #p of the linear layer 1124 is connected to the n-th node $N_3$ #n of the hidden layer $1122_3$ through the valid path), an output $H_3$ #n of the n-th node $N_3$ #n of the hidden layer $1122_3$ is represented by an equation 4. "$w_3(p,n)$" in the equation 4 represents a weight in a connecting path between the p-th node $N_5$ #p of the linear layer 1124 and the n-th node $N_3$ #n of the hidden layer $1122_3$. "$b_3(n)$" in the equation 4 represents a bias that is used (namely, added) in the n-th node $N_3$ #n of the hidden layer $1122_3$. The output $H_3$ #n of the n-th node $N_3$ #n of the hidden layer $1122_3$ is inputted to each of the node $N_4$ #1 to node $N_4$ #O through O connecting paths that connect the n-th node $N_3$ #n of the hidden layer $1122_3$ and the node $N_4$ #1 to node $N_4$ #O of the output layer 1123, respectively.

$$H_3 \#n = f(H_5 \#p \times w_3(p,n) + b_3(n))$$ [equation 4]

An output $H_4$ #o of the o-th node $N_4$ #o (note that o is a variable number that represents an integer satisfying $1 \le o \le O$) of the output layer 1123 is represented by an equation 5. "$w_4(n,o)$" in the equation 5 represents a weight in a connecting path between the n-th node $N_3$ #n of the hidden layer $1122_3$ and the o-th node $N_4$ #o of the output layer 1123. "$b_4(o)$" in the equation 5 represents a bias that is used (namely, added) in the o-th node $N_4$ #o of the output layer 1123.

$$H_4 \#o = f\left(\left(\sum_{n=1}^{N} H_3 \#n \times w_4(n, o)\right) + b_4(o)\right)$$ [equation 5]

An output of the output layer 1123 (for example, a linear sum of the outputs $H_4$ #1 to $H_4$ #O) corresponds to a final output signal $y_t$. The output signal $y_t$ corresponds to the distortion compensation signal y generated from the input signal $x_t$ at the time t. Note that the output layer 1123 may not include the activation function. In this case, the output of the output layer 1123 may be a linear sum obtained by using the outputs of the nodes $N_3$ #1 to $N_3$ #N of the hidden layer $1122_3$ as the basis.

A characteristic (substantially, a structure) of the neural network 112 is determined by parameters including the above described weight w, the above described bias b and a connection aspect CA of nodes N, for example.

The weight w includes a weight $w_2$ between the input layer 1121 and the hidden layer $1122_2$. The weight $w_2$ includes K×M weights $w_2(k,m)$ (=$w_2(1,1)$, $w_2(1,2)$, ..., $w_2(1,M)$, $w_2(2,1)$, ..., $w_2(K,M-1)$, $w_2(K,M)$) that correspond to K×M connecting paths between the input layer 1121 and the hidden layer $1122_2$. Namely, the weight $w_2$ is a vector determined by the K×M weights $w_2(k,m)$. The weight w further includes a weight $w_5$ between the hidden layer $1122_2$ and the linear layer 1124. The weight $w_5$ includes M×P weights $w_5(m,p)$ (=$w_5(1,1)$, $w_5(1,2)$, ..., $w_5(1,P)$, $w_5(2,1)$, ..., $w_5(M,P-1)$, $w_5(M,P)$) that correspond to M×P connecting paths between the hidden layer $1122_2$ and the linear layer 1124. Namely, the weight $w_5$ is a vector determined by the M×P weights $w_5(m,p)$. The weight w further includes a weight $w_3$ between the linear layer 1124 and the hidden layer $1122_3$. The weight $w_3$ includes N weights $w_3(p,n)$ that correspond to N connecting paths (valid paths) between the linear layer 1124 and the hidden layer $1122_3$. When the output $H_5$ #p_n (note that p_n is a variable number that represents either one of P integers including 1 to P) of the linear layer 1124 is inputted to the n-th node $N_3$ #n of the hidden layer $1122_3$, the N weights $w_3(p,n)$ include $w_3(p\_1,1)$, $w_3(p\_2,2)$, ..., $w_3(p\_n,n)$, ..., $w_3(p\_N-1,N-1)$ and $w_3(p\_N,N)$. Namely, the weight $w_3$ is a vector determined by the N weights $w_3(p,n)$. The weight w further includes a weight $w_4$ between the hidden layer $1122_3$ and the output layer 1123. The weight $w_4$ includes N×O weights $w_4(n,o)$ (=$w_4(1,1)$, $w_4(1,2)$, ..., $w_4(1,O)$, $w_4(2,1)$, ..., $w_4(N,O-1)$, $w_4(N,O)$) that correspond to N×O connecting paths between the hidden layer $1122_3$ and the output layer 1123. Namely, the weight $w_4$ is a vector determined by the N×O weights $w_4(n,o)$.

The connecting aspect CA includes a connecting aspect $CA_2$ between the nodes $N_1$ #1 to $N_1$ #K included in the input layer 1121 and the nodes $N_2$ #1 to $N_2$ #M included in the hidden layer $1122_2$. Note that the connecting aspect between the node N in one layer and the node N in another layer here is information that indicates a presence or an absence of the connection between the node N in one layer and the node N in another layer. Namely, the connecting aspect between the node N in one layer and the node N in another layer here is information that indicates whether or not there is the valid connecting path (namely, the valid path) through which an output of the node N in one layer is inputted to the node N in another layer. Thus, the connecting aspect $CA_2$ include information relating to the valid path between the input layer 1121 and the hidden layer $1122_2$. The connecting aspect CA includes a connecting aspect $CA_5$ between the nodes $N_2$ #1 to $N_2$ #M included in the hidden layer $1122_2$ and the nodes $N_5$ #1 to $N_5$ #P included in the linear layer 1124. The connecting aspect $CA_2$ include information relating to the valid path between the hidden layer $1122_2$ and the linear layer 1124. The connecting aspect CA includes a connecting aspect $CA_3$ between the nodes $N_5$ #1 to $N_5$ #P included in the linear layer 1124 and the nodes $N_3$ #1 to $N_3$ #N included in the hidden layer $1122_3$. The connecting aspect $CA_3$ include information relating to the valid path between the linear layer 1124 and the hidden layer $1122_3$. As described above, each node $N_3$ of the hidden layer $1122_3$ is connected to either one of the nodes $N_5$ #1 to $N_5$ #P of the linear layer 1124 through single valid path. Thus, the connecting aspect $CA_3$ includes information relating to N valid paths that correspond to N nodes $N_3$ #1 to $N_3$ #N of the hidden layer $1122_3$. The connecting aspect CA includes a connecting aspect $CA_4$ between the nodes $N_3$ #1 to $N_3$ #N included in the hidden layer $1122_3$ and the nodes $N_4$ #1 to $N_4$ #O included in the output layer 1123. The connecting aspect $CA_4$ include information relating to the valid path between the hidden layer $1122_3$ and the output layer 1123.

The bias b includes a bias $b_2$ that is added in the hidden layer $1122_2$, a bias $b_3$ that is added in the hidden layer $1122_3$ and a bias $b_4$ that is added in the output layer 1123. The bias $b_2$ includes M biases $b_2(m)$ (=$b_2(1)$, $b_2(2)$, ..., $b_2(M)$) that are added in the nodes $N_2$ #1 to $N_2$ #M included in the hidden layer $1122_2$, respectively. Namely, the bias $b_2$ is a vector determined by the M biases $b_2(m)$. The bias $b_3$ includes N biases $b_3(n)$ (=$b_3(1)$, $b_3(2)$, ..., $b_3(N)$) that are added in the nodes $N_3$ #1 to $N_3$ #N included in the hidden layer $1122_3$, respectively. Namely, the bias $b_3$ is a vector determined by the N biases $b_3(n)$. The bias $b_4$ includes O biases $b_4(o)$ (=$b_4(1)$, $b_4(2)$, ..., $b_4(O)$) that are added in the nodes $N_4$ #1 to $N_4$ #O included in the output layer 1123, respectively. Namely, the bias $b_4$ is a vector determined by the O biases $b_4(o)$.

These parameters are determined by a below described parameter determination apparatus 2. In this case, it can be said the parameter determination apparatus 2 corresponds to an apparatus that performs a learning process and an estimation process is performed by the signal transmission apparatus 1 (especially, the distortion compensation circuit 11) by using the parameters obtained by the learning process. Next, the parameter determination apparatus 2 will be described.

<2> Parameter Determination Apparatus 2

<2-1> Configuration of Parameter Determination Apparatus 2

Figure 3:
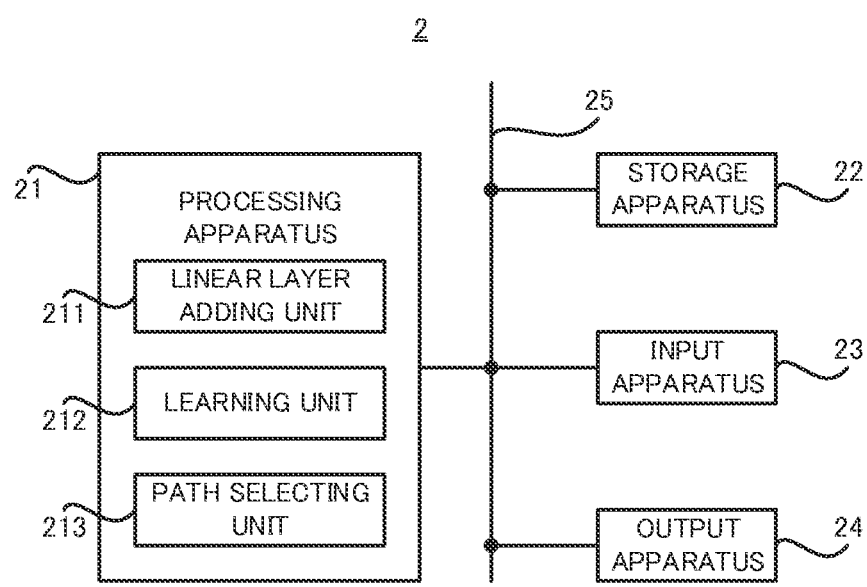
FIG. 3 is a block diagram that illustrates a hardware configuration of a parameter determination apparat in the example embodiment.

Firstly, with reference to FIG. 3, a hardware configuration of the parameter determination apparat 2 in the example embodiment will be described. FIG. 3 is a block diagram that illustrates the hardware configuration of the parameter determination apparat 2 in the example embodiment.

As illustrated in FIG. 3, the parameter determination apparatus 2 is provided with a processing apparatus 21 and a storage apparatus 22. Moreover, the parameter determination apparatus 2 may be provided with an input apparatus 23 and an output apparatus 24. However, the parameter determination apparatus 2 may not be provided with at least one of the input apparatus 23 and the output apparatus 24. The processing apparatus 21, the storage apparatus 22, the input apparatus 23 and the output apparatus 24 may be connected through a data bus.

The processing apparatus 21 is provided with a processor that includes at least one of a CPU (Central Processing Unit), a GPU (Graphic Processing Unit), a FPGA (Field Programmable Gate Array), a TPU (Tensor Processing Unit), an ASIC (Application Specific Integrated Circuit) and a quantum processor, for example. The processing apparatus 21 may be provided with single processor or may be provided with a plurality of processors. The processing apparatus 21 reads a computer program. For example, the processing apparatus 21 may read the computer program stored in the storage apparatus 22. For example, the processing apparatus 21 may read the computer program stored in a computer-readable recording medium, which is readable by a computer and which is non-transitory, by using a non-illustrated recording medium reading apparatus. The processing apparatus 21 may obtain (i.e., may download or read) the computer program from a non-illustrated apparatus located outside the parameter determination apparatus 2, through the input apparatus 23 that is configured to serve as a reception apparatus. The processing apparatus 21 executes the read computer program. As a result, a logical function block for performing an operation to be performed by the parameter determination apparatus 2 (specifically, a parameter determination operation for determining the parameters of the neural network 112) is realized in the processing apparatus 21. That is, the processing apparatus 21 is configured to serve as a controller for realizing the logical function block for performing the operation to be performed by the parameter determination apparatus 2.

FIG. 3 illustrates one example of the logical function block realized in the processing apparatus 21 to perform the parameter determination operation. As illustrated in FIG. 3, a linear layer adding unit 211, a learning unit 212 and a path selecting unit 213 are realized in the processing apparatus 21 as the logical function block for performing the parameter determination operation. The operation of each of the linear layer adding unit 211, the learning unit 212 and the path selecting unit 213 will be described later in detail.

Note that FIG. 3 merely conceptually (in other words, simply) illustrates the logical function block for performing the parameter determination operation. Namely, the logical function block illustrated in FIG. 3 is not necessarily realized in the processing apparatus 21 as it is. A configuration of the logical function block realized in the processing apparatus 21 is not limited to a configuration illustrated in FIG. 3, as long as the processing apparatus 21 is configured to perform the operation that is performed by the logical function block illustrated in FIG. 3.

The storage apparatus 22 is configured to store therein desired data. For example, the storage apparatus 22 may temporarily store a computer program to be executed by the processing apparatus 21. The storage apparatus 22 may temporarily store the data that is temporarily used by the processing apparatus 21 when the processing apparatus 21 executes the computer program. The storage apparatus 22 may store the data that is stored for a long term by parameter determination apparatus 2. Note that the storage apparatus 22 may include at least one of a RAM (Random Access Memory), a ROM (Read Only Memory), a hard disk device, a magneto-optical disk device, an SSD (Solid State Drive) and a disk array device. Namely, the storage apparatus 22 may include a non-transitory recoding medium.

The input apparatus 23 is an apparatus that receives an input of information to the parameter determination apparatus 2 from an outside of the parameter determination apparatus 2. For example, the input apparatus 23 may include an operational apparatus (for example, at least one of a keyboard, a mouse and a touch panel) that is allowed to a user of the parameter determination apparatus 2 to operate. For example, the input apparatus 23 may include a reading apparatus that is configured to read information that are recorded as a data in a recording medium that is attachable to the parameter determination apparatus 2. For example, the input apparatus 23 may include a reception apparatus (namely, a communication apparatus) that is configured to receive information that is transmitted as a data to the parameter determination apparatus 2 from an outside of the parameter determination apparatus 2 through a communication network.

The output apparatus 24 is an apparatus that outputs information to an outside of the parameter determination apparatus 2. For example, the output apparatus 24 may output information relating to the parameter determination operation performed by the parameter determination apparatus 2 (for example, information relating to the determined parameters). A transmission apparatus that is configured to transmit information as a data through a communication network or a data bus is one example of the output apparatus 24. A display that is configured to output (namely, configured to display) information as an image is one example of the output apparatus 24. A speaker that is configured to output information as a sound is one example of the output apparatus 24. A printer that is configured to output a document on which information is printed is one example of the output apparatus 24.

<2-2> Parameter Determination Operation

Figure 4:
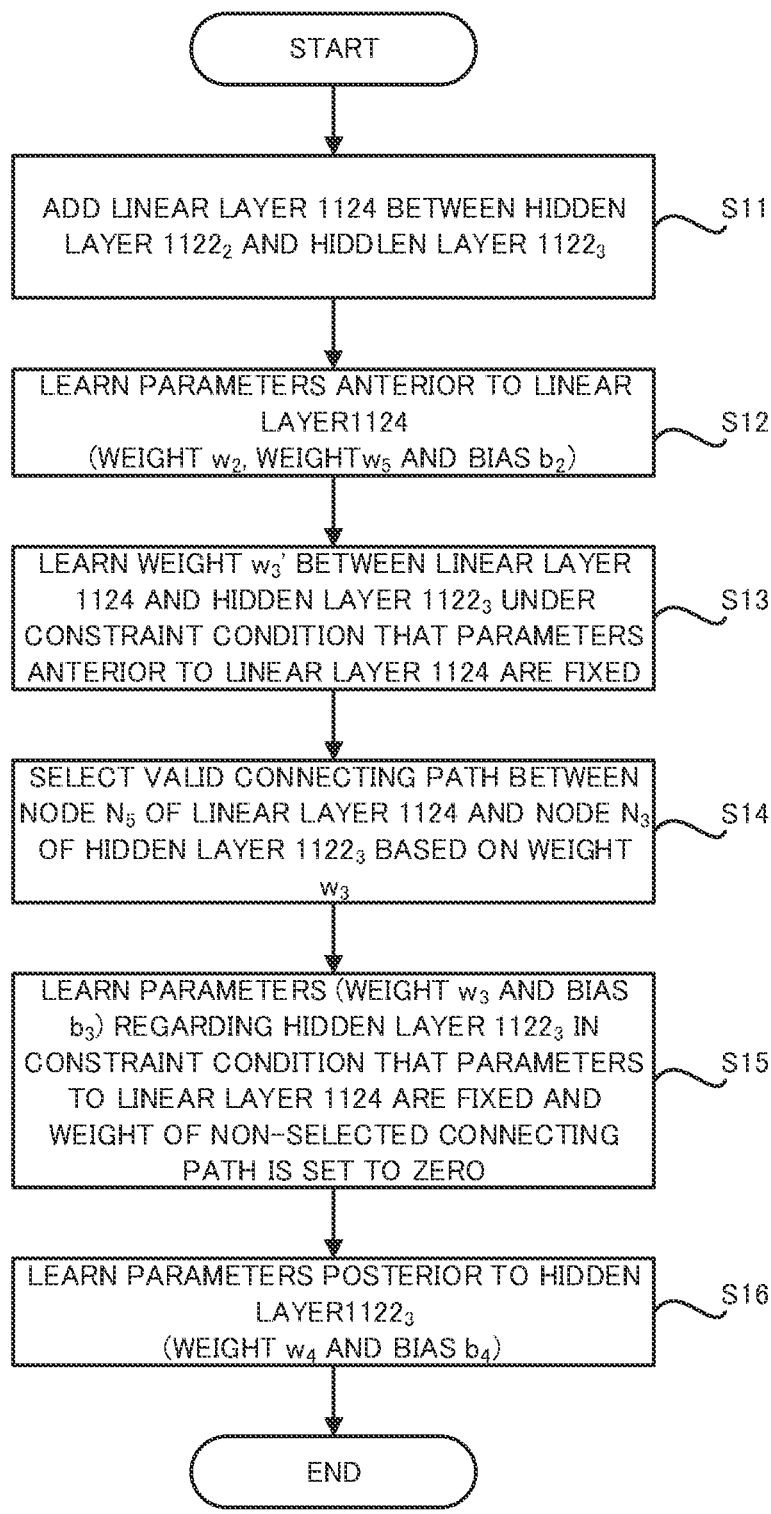
FIG. 4 is a flowchart that illustrates a flow of an operation of the parameter determination apparat.

Firstly, with reference to FIG. 4, a flow of the parameter determination operation performed by the parameter determination apparat 2 in the example embodiment will be described. FIG. 4 is a flowchart that illustrates the flow of the parameter determination operation performed by the parameter determination apparat 2 in the example embodiment.

As illustrated in FIG. 4, the linear layer adding unit 211 adds the linear layer 1124 to a neural network 112_initial in an initial state (in other words, a default state) that includes the input layer 1121, the hidden layers $1122_2$ to $1122_3$ and the output layer 1123 and that does not include the linear layer 1124 (a step S11). Namely, the linear layer adding unit 211 adds the linear layer 1124 to the neural network 112_initial in the initial state (the step S11). The liner layer adding unit 211 adds the liner layer 1124 between the hidden layer $1122_2$ and the hidden layer $1122_3$, because the example embodiment describes the example in which the liner layer 1124 is added between the hidden layer $1122_2$ and the hidden layer $1122_3$ as described above.

Figure 5:
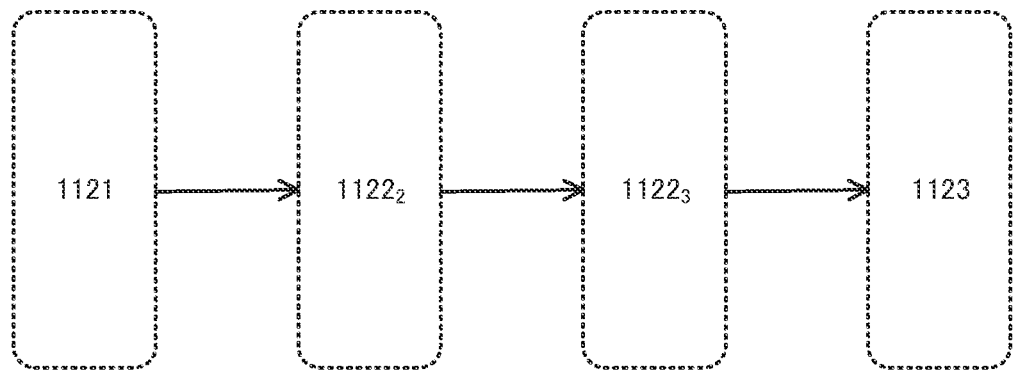
FIG. 5 is a schematic view that illustrates a neural network in an initial state and a neural network to which a linear layer is added.
Figure 5:
Figure 5:
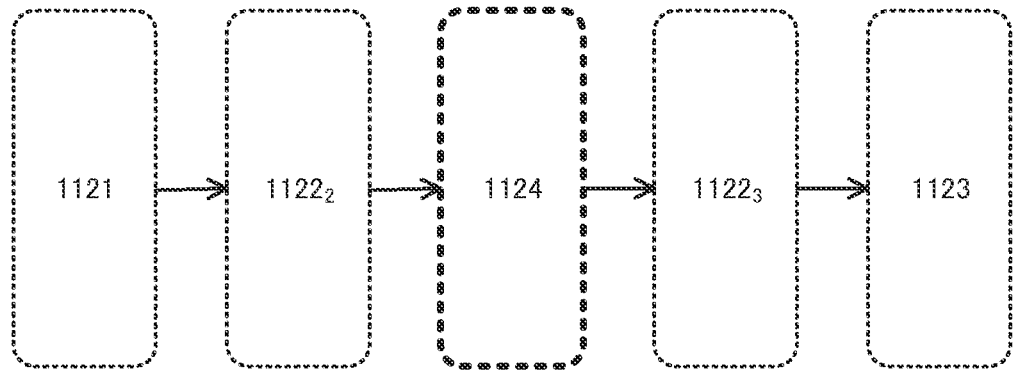

A general neural network includes the hidden layer 1122 but does not include the linear layer 1124 between the input layer 1121 and the output layer 1123, as illustrated in an upper part of FIG. 5. Thus, the general neural network illustrated in the upper part of FIG. 5 is used as the neural network 112_initial in the initial state. As a result of the linear layer adding unit 211 adding the linear layer 1124 to the neural network 112_initial in the initial state, the neural network 112_initial in the initial state turns to be a neural network 112_learn that includes the input layer 1121, the hidden layers $1122_2$ to $1122_3$, the output layer 1123 and the linear layer 1124. The neural network 112_learn corresponds to a basic model of the neural network 112 that is actually used by the signal transmission apparatus 1. In this case, the linear layer 1124 may be regarded to be added as new layer that constitutes a part of the neural network 112 (the neural network 112_learn). In this case, the neural network 112_learn may be regarded as a neural network for the learning process that is used to determine (namely, learn) the parameters of the neural network 112. Thus, the parameter determination apparatus 2 determines (namely, learns) the parameters of the neural network 112 by using the neural network 112_1 earn.

Figure 6:
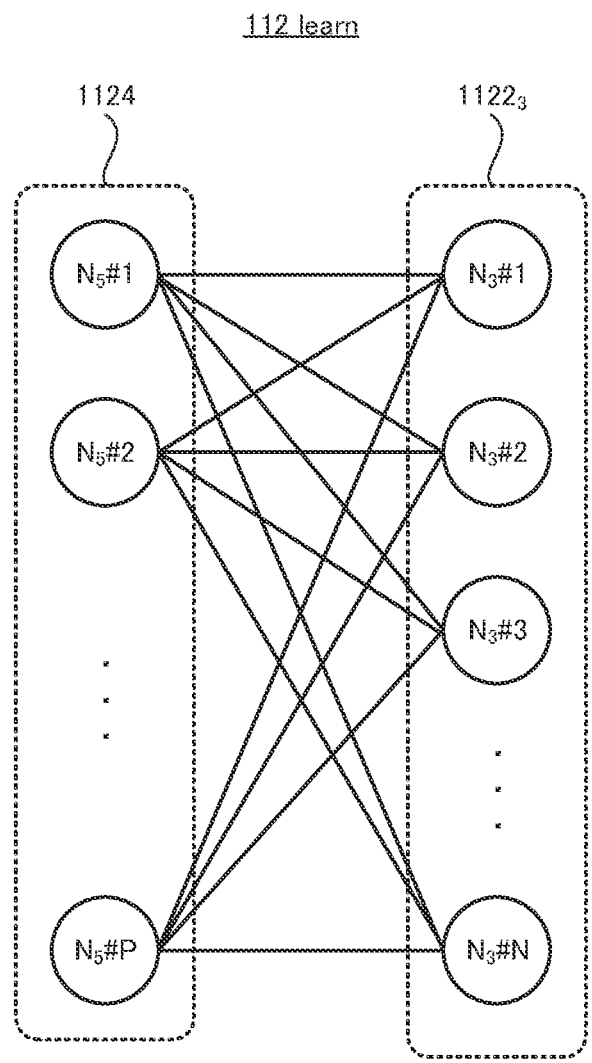
FIG. 6 is a schematic view that illustrates a connecting path between the linear layer and a hidden layer.

As described above, each node $N_3$ of the hidden layer $1122_3$ is connected to either one of the nodes $N_5$ #1 to $N_5$ #P of the linear layer 1124 through single valid path in the neural network 112. On the other hand, at a timing when the linear layer 1124 is added at the step S11, each node $N_3$ of the hidden layer $1122_3$ may be connected to the nodes $N_5$ #1 to $N_5$ #P through P connecting paths that connect each node $N_3$ of the hidden layer $1122_3$ and the nodes $N_5$ #1 to $N_5$ #P of the linear layer 1124, respectively, in the neural network 112_learn. Namely, as illustrated in FIG. 6 that illustrates the neural network 112_1 earn, each node $N_5$ of the linear layer 1124 may be connected to the nodes $N_3$ #1 to $N_3$ #N through N connecting paths that connect each node $N_3$ of the linear layer 1124 and the nodes $N_3$ #1 to $N_3$ #N of the hidden layer $1122_3$, respectively, in the neural network 112_1 earn. In other words, the linear layer 1124 and the hidden layer $1122_3$ may be connected through P×N connecting paths that connect the P nodes $N_5$ #1 to $N_5$ #P of the linear layer 1124 and the N nodes $N_3$ #1 to $N_3$ #N of the hidden layer $1122_3$ in the neural network 112_1 earn. The parameter determination apparatus 2 performs processes from a below described step S12 to step S14 to select the N valid paths that correspond to N nodes $N_3$ #1 to $N_3$ #N of the hidden layer $1122_3$, respectively, from the P×N connecting paths between the linear layer 1124 and the hidden layer $1122_3$.

Specifically, the leaning unit 212 firstly learns the parameters of a network part that is anterior to (namely, at an upstream side of) the linear layer 1124 and that is a part of the neural network 112_learn (a step S12). Note that initial values of the parameters of the neural network 112_learn may be determined by using a random number. The parameters of the network part that is anterior to (namely, at the upstream side of) the linear layer 1124 may include the weight $w_2$ between the input layer 1121 and the hidden layer $1122_2$, the weight $w_5$ between the hidden layer $1122_2$ and the linear layer 1124, the connecting aspect $CA_2$ between the input layer 1121 and the hidden layer $1122_2$ (namely, the valid path between the input layer 1121 and the hidden layer $1122_2$), the connecting aspect $CA_5$ between the hidden layer $1122_2$ and the linear layer 1124 (namely, the valid path between the hidden layer $1122_2$ and the linear layer 1124) and the bias $b_2$ that is added in the hidden layer $1122_2$.

In order to lean the parameters of the neural network 112_learn, the learning unit 212 input a sample signal (namely, a sample data) to the neural network 112_learn. Then, the learning unit 212 changes the parameters of the neural network 112_learn so that an error between a label signal (a label) assigned to the sample signal and a signal that is outputted from the neural network 112_learn (namely, a learning error) becomes smaller (preferably, becomes minimum). A squared error between the label signal and the signal that is outputted from the neural network 112_learn may be used as the learning error. The determined parameters are used as the parameters of a network part that is anterior to (namely, at the upstream side of) the linear layer 1124 and that is a part of the neural network 112.

Each of the sample signal and the label signal may be a signal based on at least one of the input signal x, the distortion compensation signal y and the transmission signal z, for example. Each of the sample signal and the label signal may be a signal that is generated by using at least one of the input signal x, the distortion compensation signal y and the transmission signal z, for example. A method of generating the sample signal and the label signal may be selected on the basis of an algorithm for the distortion compensation in the distortion compensation circuit 11. For example, when an algorithm in accordance with an indirect learning method is used as the algorithm for the distortion compensation in the distortion compensation circuit 11, a signal corresponding to the transmission signal z may be used as the sample data and a signal corresponding to the distortion compensation signal y or the input signal x may be used as the label signal. Namely, the distortion compensation signal y that should be outputted from the distortion compensation circuit 11 or the input signal x that should be inputted to the distortion compensation circuit 11 when a certain sample signal is outputted from the power amplifier 12 as the transmission signal z may be used as the label signal. Alternatively, for example, when an algorithm in accordance with a direct learning method is used as the algorithm for the distortion compensation in the distortion compensation circuit 11, a signal corresponding to the input signal x may be used as the sample data and a signal corresponding to the distortion compensation signal y may be used as the label signal. Namely, the distortion compensation signal y that should be outputted from the distortion compensation circuit 11 (namely, the distortion compensation signal y that is obtained by performing an ILC (Iterative Learning Control)) when a certain sample signal is inputted to the distortion compensation circuit 11 may be used as the label signal.

Then, the learning unit 212 learns at least the weight $w_3$ between the linear layer 1124 and the hidden layer $1122_3$ under a constraint condition that the parameters of the network part of the neural network 112_learn that is anterior to the linear layer 1124 are fixed to the parameters determined at the step S12 (namely, are not changed) (a step S13).

Namely, the learning unit 212 learns at least the weight $w_3$ between the linear layer 1124 and the hidden layer $1122_3$ under a constraint condition that the parameters determined at the step S12 are fixed (namely, are not changed) (the step S13). Incidentally, as described later, the weight $w_3$ learned by the learning unit 212 at the step S13 is a parameter that is used by the path selecting unit 213 to determine the valid path between the linear layer 1124 and the hidden layer $1122_3$. The weight $w_3$ learned by the learning unit 212 at the step S13 is not actually used as the weight $w_3$ of the neural network 112. Thus, for the purpose of clear description, the weight $w_3$ learned by the learning unit 212 at the step S13 is referred to as a "weight $w_3$'" to distinguish it from the actual weight $w_3$ of the neural network 112 (namely, weight $w_3$ learned by the learning unit 212 at a below described step S15). In order to learn the weight $w_3$', the learning unit 212 inputs the sample signal to the neural network 112_learn in which the parameters of the network part that is anterior to the linear layer 1124 are fixed. Then, the learning unit 212 changes at least weight $w_3$' so that the error between the label signal and the signal that is outputted from the neural network 112_learn (namely, the learning error) becomes smaller (preferably, becomes minimum).

After the learning unit 212 completes learning the weight $w_3$' at the step S13, the path selecting unit 213 selects the valid path between the linear layer 1124 and the hidden layer $1122_3$ on the basis of the weight $w_3$' learned by the learning unit 212 (a step S14). Namely, the path selecting unit 213 selects, on the basis of the weight $w_3$', the N valid paths that correspond to N nodes $N_3$ #1 to $N_3$ #N of the hidden layer $1122_3$, respectively, from the P×N connecting paths between the linear layer 1124 and the hidden layer $1122_3$. In other words, the path selecting unit 213 selects, on the basis of the weight $w_3$', one valid path for each of the N nodes $N_3$ #1 to $N_3$ #N of the hidden layer $1122_3$ from the P×N connecting paths between the linear layer 1124 and the hidden layer $1122_3$.

Specifically, the path selecting unit 213 selects, as the valid path, either one of P connecting paths that connect the n-th node $N_3$ #n of the hidden layer $1122_3$ and the node $N_5$ #1 to node $N_5$ #P of the linear layer 1124, respectively, on the basis of P weights $w_3$' (1,n) to $w_3$'(P,n) in the P connecting paths. On the other hand, the path selecting unit 213 does not select, as the valid path, residual P−1 connecting path of the P connecting paths that connect the n-th node $N_3$ #n of the hidden layer $1122_3$ and the node $N_5$ #1 to node $N_5$ #P of the linear layer 1124, respectively. The path selecting unit 213 performs same operation with respect to each of the N nodes $N_3$ #1 to $N_3$ #N of the hidden layer $1122_3$. Namely, the path selecting unit 213 selects single valid path that is connected to the node $N_3$ #1 on the basis of P weights $w_3$'(1,1) to $w_3$'(P,1) in the P connecting paths that connect the first node $N_3$ #1 of the hidden layer $1122_3$ and the node $N_5$ #1 to node $N_5$ #P of the linear layer 1124, respectively, selects single valid path that is connected to the node $N_3$ #2 on the basis of P weights $w_3$'(1,2) to $w_3$'(P,2) in the P connecting paths that connect the second node $N_3$ #2 of the hidden layer $1122_3$ and the node $N_5$ #1 to node $N_5$ #P of the linear layer 1124, respectively, . . . , and selects single valid path that is connected to the node $N_3$ #N on the basis of P weights $w_3$'(1,N) to $w_3$'(P,N) in the P connecting paths that connect the N-th node $N_3$ #N of the hidden layer $1122_3$ and the node $N_5$ #1 to node $N_5$ #P of the linear layer 1124, respectively.

The path selecting unit 213 may select, as the valid path, one connecting path the weight $w_3$'(p,n) of which is maximum from the P connecting paths that connect the n-th node $N_3$ #n of the hidden layer $1122_3$ and the node $N_5$ #1 to node $N_5$ #P of the linear layer 1124, respectively. On the other hand, the path selecting unit 213 may not select, as the valid path, residual P−1 connecting path the weight $w_3$'(p,n) of which is not maximum from the P connecting paths that connect the n-th node $N_3$ #n of the hidden layer $1122_3$ and the node $N_5$ #1 to node $N_5$ #P of the linear layer 1124, respectively. Namely, the path selecting unit 213 may select, as the valid path that is connected to the node $N_3$ #1, one connecting path the weight $w_3$'(p,1) of which is maximum from the P connecting paths that connect the first node $N_3$ #1 of the hidden layer $1122_3$ and the node $N_5$ #1 to node $N_5$ #P of the linear layer 1124, respectively, may select, as the valid path that is connected to the node $N_3$ #2, one connecting path the weight $w_3$'(p,2) of which is maximum from the P connecting paths that connect the second node $N_3$ #2 of the hidden layer $1122_3$ and the node $N_5$ #1 to node $N_5$ #P of the linear layer 1124, respectively, . . . , and may select, as the valid path that is connected to the node $N_3$ #N, one connecting path the weight $w_3$'(p,N) of which is maximum from the P connecting paths that connect the N-th node $N_3$ #N of the hidden layer $1122_3$ and the node $N_5$ #1 to node $N_5$ #P of the linear layer 1124, respectively.

Figure 7:
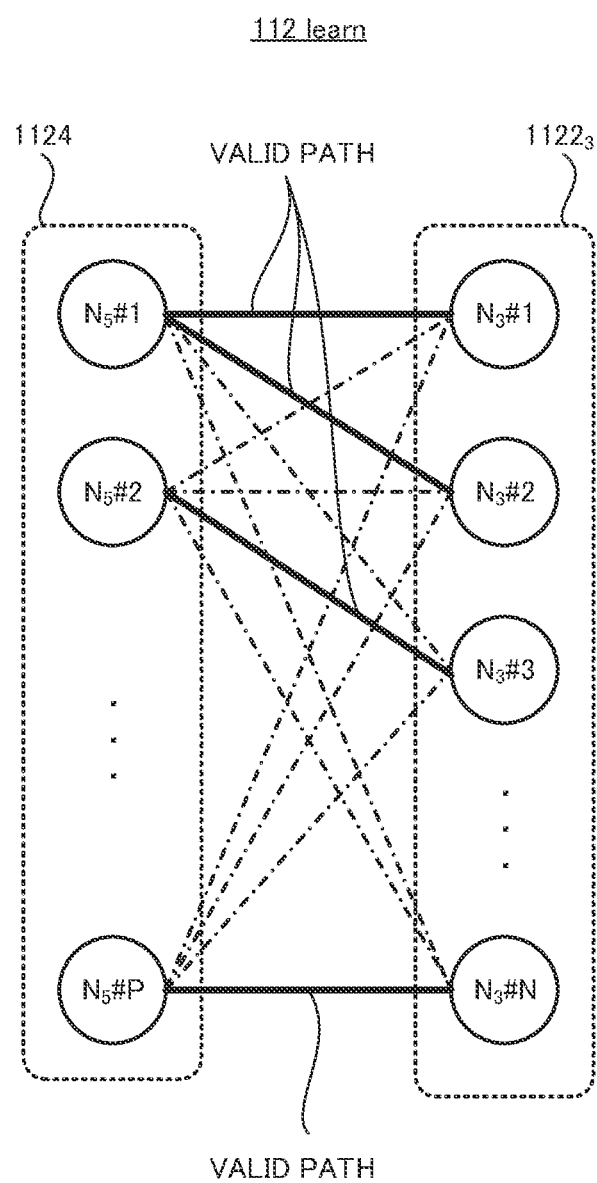
FIG. 7 is a schematic view that illustrates a connecting path between the linear layer and the hidden layer.

Specifically, for example, when the weight $w_3$'(1,1) of the connecting path that connects the node $N_3$ #1 and the first node $N_5$ #1 of the linear layer 1124 is maximum in the P connecting paths that are connected to the first node $N_3$ #1 of the hidden layer $1122_3$ (namely, such a condition that $w_3$'(1,1)>$w_3$'(2,1), $w_3$'(3,1), . . . , $w_3$'(P,1) is satisfied), the path selecting unit 213 selects, as the valid path, the connecting path that connects the node $N_5$ #1 and the node $N_3$ #1 as illustrated in FIG. 7. For example, when the weight $w_3$'(1,2) of the connecting path that connects the node $N_3$ #2 and the first node $N_5$ #1 of the linear layer 1124 is maximum in the P connecting paths that are connected to the second node $N_3$ #2 of the hidden layer $1122_3$ (namely, such a condition that $w_3$'(1,2)>$w_3$'(2,2), $w_3$'(3,2), . . . , $w_3$'(P,2) is satisfied), the path selecting unit 213 selects, as the valid path, the connecting path that connects the node $N_5$ #1 and the node $N_3$ #2 as illustrated in FIG. 7. For example, when the weight $w_3$'(2,3) of the connecting path that connects the node $N_3$ #3 and the second node $N_5$ #2 of the linear layer 1124 is maximum in the P connecting paths that are connected to the third node $N_3$ #3 of the hidden layer $1122_3$ (namely, such a condition that $w_3$'(2,3)>$w_3$'(1,3), $w_3$'(3,3), . . . , $w_3$'(P,3) is satisfied), the path selecting unit 213 selects, as the valid path, the connecting path that connects the node $N_5$ #2 and the node $N_3$ #3 as illustrated in FIG. 7. For example, when the weight $w_3$'(P,N) of the connecting path that connects the node $N_3$ #N and the P-th node $N_5$ #P of the linear layer 1124 is maximum in the P connecting paths that are connected to the N-th node $N_3$ #N of the hidden layer $1122_3$ (namely, such a condition that $w_3$'(P,N)>$w_3$'(1,N), $w_3$'(2,N), . . . , $w_3$'(P−1,N) is satisfied), the path selecting unit 213 selects, as the valid path, the connecting path that connects the node $N_5$ #P and the node $N_3$ #N as illustrated in FIG. 7.

Figure 8:
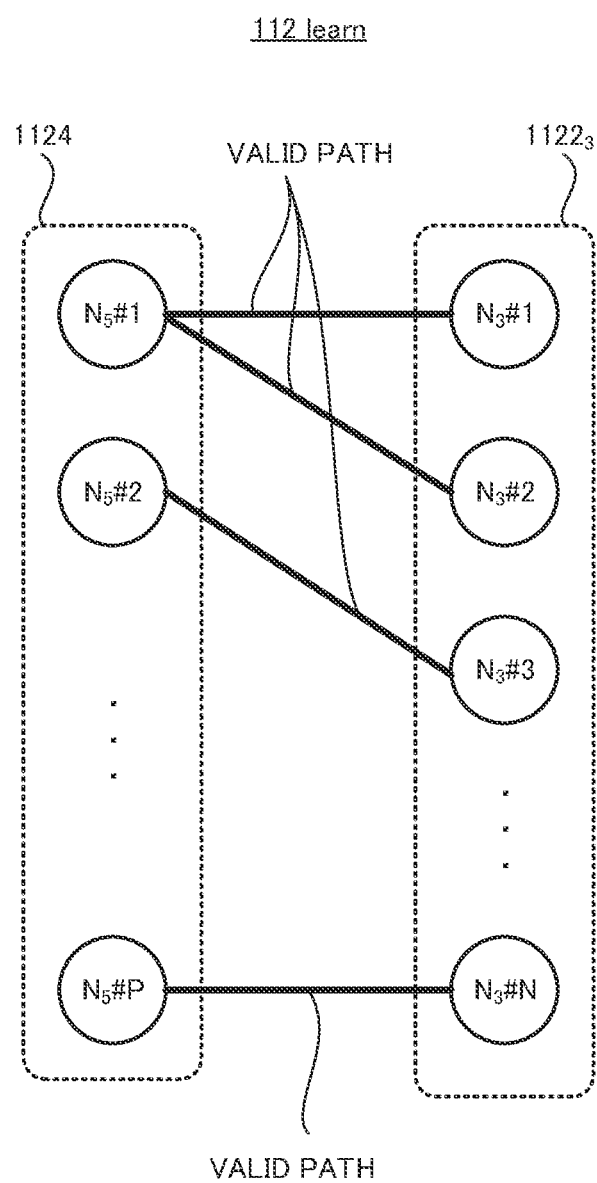
FIG. 8 is a schematic view that illustrates a connecting path between the linear layer and the hidden layer.

On the other hand, the connecting path that is not selected by the path selecting unit 213 is not used as the valid connecting path in the neural network 112. Namely, the node $N_5$ of the linear layer 1124 and the node $N_3$ of the hidden layer $1122_3$ are not connected through the connecting path that is not selected by the path selecting unit 213 in the neural network 112 based on the parameters determined by the parameter determination apparatus 1. Thus, an operation for selecting the valid path is substantially equivalent to an operation for determining the connecting aspect CA (in this case, the connecting aspect $CA_3$). FIG. 8 is a schematic view that in which the valid paths between the linear layer 1124 and the hidden layer $1122_3$ are illustrated and the connecting paths other than the valid paths are not illustrated. As illustrated in FIG. 8, the selection of the valid path allows a structure between the linear layer 1124 and the hidden layer $1122_3$ to be a sparse structure. The sparse structure results in a reduction of a processing amount of the neural network 112.

After the path selecting unit 213 completes selecting the valid path, the learning unit 212 learns the parameters relating to the hidden layer $1122_3$ under a constraint condition that the parameters of the network part of the neural network 112_1 earn that is anterior to the linear layer 1124 are fixed to the parameters determined at the step S12 (namely, are not changed) (a step S13). The parameters relating to the hidden layer $1122_3$ may include the weight $w_3$ between the linear layer 1124 and the hidden layer $1122_3$ and the bias $b_3$ that is added in the hidden layer $1122_3$.

The learning unit 212 does not use, as the valid connecting path, the connecting path that is not selected by the path selecting unit 213 at the step S15. Namely, the learning unit 212 learns the parameters relating to the hidden layer $1122_3$ under a constraint condition that the nodes N are not connected through the connecting path that is not selected by the path selecting unit 213. For example, the learning unit 212 may learn the parameters relating to the hidden layer $1122_3$ under a constraint condition that the weight $w_3$ of the connecting path that is not selected by the path selecting unit 213 is zero.

Then, the learning unit 212 learns the parameters of a network part that is posterior to (namely, at a downstream side of) the hidden layer $1122_3$ and that is a part of the neural network 112_learn under a constraint condition that the parameters of a network part that is anterior to the hidden layer $1122_3$ and that is a part of the neural network 112_learn are fixed to the parameters determined at the steps S12 and S15 (namely, are not changed) (a step S16). The parameters of the network part that is posterior to the hidden layer $1122_3$ may include the weight $w_4$ between the hidden layer $1122_3$ and the output layer 1123 and the bias $b_4$ that is added in the output layer 1123. As a result, the parameters of the neural network 112 are determined.

The parameter determination apparatus 2 typically determines the parameters of the neural network 112 before the signal transmission apparatus 1 is shipped. As a result, the signal transmission apparatus 1 in which the neural network 112 based on the parameters determined by the parameter determination apparatus 2 is implemented in a manufacturing factory, for example, is shipped. In this case, the parameter determination apparatus 2 may be typically implemented by using an apparatus (typically, a relatively fast processing apparatus such as a GPU) outside the signal transmission apparatus 1. However, as described later, at least a part of the parameter determination apparatus 2 may be implemented in the signal transmission apparatus 1. The parameter determination apparatus 2 may determine the parameters of the neural network 112 after the signal transmission apparatus 1 is shipped (for example, during an operation of the signal transmission apparatus 1).

<2-3> Technical Effect of Parameter Determination Apparatus 2

As described above, the parameter determination apparatus 2 is capable of selecting one valid path for each of the N nodes $N_3$ #1 to $N_3$ #N of the hidden layer $1122_3$ from the P×N connecting paths between the linear layer 1124 and the hidden layer $1122_3$. As a result, the parameter determination apparatus 2 is capable of building the neural network 112 including the linear layer 1124 that is connected to the hidden layer $1122_3$ through the N valid paths. Thus, the parameter determination apparatus 2 is capable of building the neural network 112 that requires a relatively small processing amount, compared to a neural network in a comparison example that does not include the linear layer 1124. Specifically, in the neural network in the comparison example that does not include the linear layer 1124, the hidden layer $1122_2$ and the hidden layer $1122_3$ are connected through M×N connecting paths (namely, M×N valid paths) that connect the nodes $N_2$ #1 to $N_2$ #M of the hidden layer $1122_2$ and the nodes $N_3$ #1 to $N_3$ #N of the hidden layer $1122_3$, respectively. Thus, the signal transmission apparatus 1 needs to perform a matrix multiplication by M×N times in order to generate the output of the hidden layer $1122_3$ from the output of the hidden layer $1122_2$. On the other hand, in the neural network 112 in the example embodiment, the hidden layer $1122_2$ and the linear layer 1124 are connected through M×P connecting paths (namely, M×P valid paths) that connect the nodes $N_2$ #1 to $N_2$ #M of the hidden layer $1122_2$ and the nodes $N_5$ #1 to $N_5$ #P of the linear layer 1124, respectively. Thus, the signal transmission apparatus 1 needs to perform a matrix multiplication by M×P times in order to generate the output of the linear layer 1124 from the output of the hidden layer $1122_2$. Moreover, the linear layer 1124 and the hidden layer $1122_3$ are connected through N connecting paths. Thus, the signal transmission apparatus 1 needs to perform a matrix multiplication by N times in order to generate the output of the hidden layer $1122_3$ from the output of the linear layer 1124. Therefore, the signal transmission apparatus 1 needs to perform a matrix multiplication by M×P+N times in order to generate the output of the hidden layer $1122_3$ from the output of the hidden layer $1122_2$. Here, as described above, the number of the node $N_5$ of the linear layer 1124 is smaller than the number of the node $N_3$ of the hidden layer $1122_3$, P<N is satisfied. When the condition that P<N is satisfied, there is a higher possibility that the number (=M×P+N) of the matrix multiplication required in the example embodiment is smaller than the number (=M×N) of the matrix multiplication required in the comparison example. Thus, the parameter determination apparatus 2 is capable of building the neural network 112 that requires a relatively small processing amount, compared to the neural network in the comparison example that does not include the linear layer 1124. As a result, the signal transmission apparatus 1 is capable of transmitting the input signal x by using the neural network 112 that requires a relatively small processing amount.

Especially, in the neural network in the comparison example, the outputs $H_2$ #1 to $H_2$ #M of the nodes $N_2$ #1 to $N_2$ #M of the hidden layer $1122_2$ (alternatively, any first layer) are sometimes similar to each other. In this case, input signals that are similar to each other are expected to be inputted to the nodes $N_3$ #1 to $N_3$ #N of the hidden layer $1122_3$ to which the output of the hidden layer $1122_2$ is inputted (alternatively, any second layer to which an output of any first layer is inputted). However, even in this situation, a set of the weights $w_3$ (1,1) to $w_3$ (M,1) for generating the input signal that is inputted to the node $N_3$ #1, a set of the weights $w_3$ (1,2) to $w_3$ (M,2) for generating the input signal that is inputted to the node $N_3$ #2, . . . , and a set of the weights $w_3$ (1,N) to $w_3$ (M,N) for generating the input signal that is inputted to the node $N_3$ #N are often entirely different sets of the weights. As a result, a plurality of processes using entirely different sets of the weights are performed separately (in other words, in parallel) in order to generate the plurality of input signals that are similar to each other. Thus, there is a possibility that the processing amount increases more than necessary. On the other hand, in the example embodiment, the linear layer 1124 that includes the node $N_5$ the number of which is smaller than the number of the node $N_3$ of the hidden layer $1122_3$. Thus, same structure is commonly used to generate the input signals that are inputted to at least two nodes $N_3$ of the hidden layer $1122_3$. Namely, the signal transmission apparatus 1 is capable of inputting the output of the same node $N_5$ to at least two node $N_3$ that are different from each other. In other words, the signal transmission apparatus 1 is capable of generating the input signals that are inputted to at least two node $N_3$ by using the same node $N_5$. Thus, in the example embodiment, since same structure is commonly used to generate the input signals that are inputted to at least two nodes N of a certain layer, it is possible to generate the neural network 112 that requires a relatively small processing amount, compared to the case where same structure is not commonly used to generate the input signals that are inputted to at least two nodes N of a certain layer.

Note that such a condition that M×P+N<M×N is satisfied when the number (=M×P+N) of the matrix multiplication required in the example embodiment is smaller than the number (=M×N) of the matrix multiplication required in the comparison example. An equation P<N×(M−1)/M is obtained from an equation representing this condition. Thus, the number P of the node $N_5$ of the linear layer 1124 and the number N of the node $N_3$ of the hidden layer $1122_3$ may satisfy the condition that P<N×(M−1)/M. In this case, the parameter determination apparatus 2 is capable of surely building the neural network 112 that requires a smaller processing amount, compared to the neural network in the comparison example that does not include the linear layer 1124.

Moreover, the parameter determination apparatus 2 is capable of selecting, as the valid path, one connecting path the weight $w_3'(p,n)$ of which is maximum from the P connecting paths that connect the n-th node $N_3$ #n of the hidden layer $1122_3$ and the node $N_5$ #1 to node $N_5$ #P of the linear layer 1124, respectively. Here, the connecting path the weight $w_3'(p,n)$ of which is maximum contributes to the output of the neural network 112 more than the connecting path the weight $w_3'(p,n)$ of which is not maximum. Thus, when one connecting path the weight $w_3'(p,n)$ of which is maximum is selected as the valid path, there is a smaller possibility that the output of the neural network 112 deteriorates (for example, an effect of the distortion compensation of the distortion compensation signal y decreases), compared to the case where one connecting path the weight $w_3'(p,n)$ of which is not maximum is selected as the valid path. Thus, the parameter determination apparatus 2 is capable of preventing the deterioration of the output of the neural network 112 while achieving the above described effect of building the neural network 112 that requires a small processing amount by minimizing the number of the valid path between the hidden layer $1122_3$ and the linear layer 1124.

Moreover, in the example embodiment, each node $N_5$ of the linear layer 1124 is a node in which a bias $b_5$ is not added. Thus, the signal transmission apparatus 1 does not necessarily perform the matrix multiplication that is required to add the bias $b_5$ in the linear layer 1124. As a result, the parameter determination apparatus 2 is capable of building the neural network 112 that requires a relatively small processing amount, compared to a neural network in another comparison example in which the bias $b_5$ is added in each node $N_5$ of the linear layer 1124.

<3> Modified Example

<3-1> Modified Example of Neural Network 112

In the above described description, either one of the outputs $H_5$ #1 to $H_5$ #P of the linear layer 1124 is inputted to each node $N_3$ of the hidden layer $1122_3$. Namely, each node $N_3$ of the hidden layer $1122_3$ is connected to either one of the nodes $N_5$ #1 to $N_5$ #P of the linear layer 1124 through the single valid path. However, at least two of the outputs $H_5$ #1 to $H_5$ #P of the linear layer 1124 may be inputted to each node $N_3$ of the hidden layer $1122_3$. Namely, each node $N_3$ of the hidden layer $1122_3$ may be connected to at least two of the nodes $N_5$ #1 to $N_5$ #P of the linear layer 1124 through at least two valid paths. In this case, the path selecting unit 213 may select at least two valid paths for each of the N nodes $N_3$ #1 to $N_3$ #N of the hidden layer $1122_3$ from the P×N connecting paths between the linear layer 1124 and the hidden layer $1122_3$ at the step S14 in FIG. 4. Namely, the path selecting unit 213 may select, as at least two valid paths, at least two connecting paths of the P connecting paths that connect the n-th node $N_3$ #n of the hidden layer $1122_3$ and the node $N_5$ #1 to node $N_5$ #P of the linear layer 1124, respectively. For example, the path selecting unit 213 may select, as at least two valid paths, at least two connecting paths the weights $w_3'(p,n)$ of which are larger than the others from the P connecting paths that connect the n-th node $N_3$ #n of the hidden layer $1122_3$ and the node $N_5$ #1 to node $N_5$ #P of the linear layer 1124, respectively.

In the above described description, each node $N_5$ of the linear layer 1124 is a node in which the bias $b_5$ is not added. However, at least one of the nodes $N_5$ #1 to $N_5$ #P of the linear layer 1124 may be a node in which the bias $b_5$ is added. However, when each node $N_3$ of the hidden layer $1122_3$ is connected to either one of the nodes $N_5$ #1 to $N_5$ #P of the linear layer 1124 through the single valid path as described above, an operation for adding the bias $b_5$ in each node $N_5$ of the linear layer 1124 is substantially equivalent to an operation for adding the bias $b_3$ in each node $N_3$ of the hidden layer $1122_3$. Namely, the operation for adding the bias $b_3$ in each node $N_3$ of the hidden layer $1122_3$ can be replaced by the operation for adding the bias $b_5$ in each node $N_5$ of the linear layer 1124. Thus, the operation for adding the bias $b_5$ in at least one of the nodes $N_5$ #1 to $N_5$ #P of the linear layer 1124 is especially effective when each node $N_3$ of the hidden layer $1122_3$ is connected to at least two of the nodes $N_5$ #1 to $N_5$ #P of the linear layer 1124 through at least two valid paths. Note that the parameter determination apparatus 2 may learn the bias $b_3$ at the step S12 in FIG. 4, when at least one of the nodes $N_5$ #1 to $N_5$ #P of the linear layer 1124 may be a node in which the bias $b_5$ is added.

<3-2> Modified Example of Signal Transmission Apparatus 1

<3-2-1> Signal Transmission Apparatus 1a in First Modified Example

Figure 9:
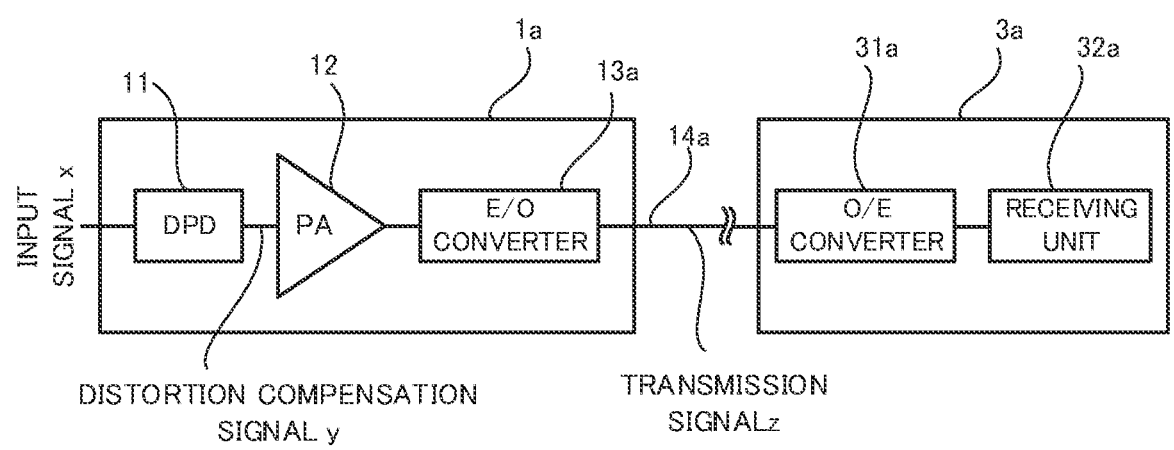
FIG. 9 is a block diagram that illustrates a configuration of a signal transmission apparatus in a first modified example.

With reference to FIG. 9, a signal transmission apparatus 1a in a first modified example will be described. FIG. 9 is a block diagram that illustrates a configuration of the signal transmission apparatus 1a in the first modified example.

As illustrated in FIG. 9, the signal transmission apparatus 1a is different from the signal transmission apparatus 1 in that the signal transmission apparatus 1a is an apparatus that is configured to transmit the transmission signal z through an optical communication network (for example, an optical communication line). In this case, the signal transmission apparatus 1a is different from the signal transmission apparatus 1 in that the signal transmission apparatus 1a is provided with an E/O converter 13a that converts the transmission signal z, which is outputted from the power amplifier 12, to an optical signal. As a result, the transmission signal z that is converted to the optical signal is transmitted through a signal propagation path 14a (namely, a signal propagation path that constitutes at least a part of the optical communication network) such as an optical fiber. A part or whole of the signal propagation path 14a may be a component that constitutes the signal transmission apparatus 1a. Alternatively, the signal propagation path 14a may be a component that is different from the signal transmission apparatus 1a.

A signal reception apparatus 3a that receives the transmission signal z converts the transmission signal z that is the optical signal to an electric signal by using an O/E converter 31a, and then receives the transmission signal that is converted to the electric signal by using a receiving unit 32a.

The distortion compensation circuit 11 may perform, on the input signal x, a distortion compensation for compensating a distortion that is generated due to the transmission of the transmission signal z in the signal propagation path 14a (namely, a distortion that is generated in the transmission signal z in the signal propagation path 14a), in addition to or instead of the distortion that is generated in the transmission signal z due to the operation of the power amplifier 12. As a result, even when the transmission signal z is transmitted through the optical communication network (for example, the optical communication line), the distortion of the transmission signal z is properly compensated. In this case, considering that the distortion that is generated in the transmission signal z in the signal propagation path 14a, each of the sample signal and the label signal described above may be a signal based on a reception signal that is received by the signal reception apparatus 3a (namely, a signal that includes the distortion that is generated in the transmission signal z in the signal propagation path 14a), in addition to or instead of at least one of the input signal x, the distortion compensation signal y and the transmission signal z, for example.

Incidentally, when the transmission signal z that is converted to the optical signal is transmitted, the signal generating unit 111 may input, to the neural network 112, a X polarized wave component and a Y polarized wave component of the input signal $x_t$, instead of the above described various signals.

<3-2-2> Signal Transmission Apparatus 1b in Second Modified Example

Figure 10:
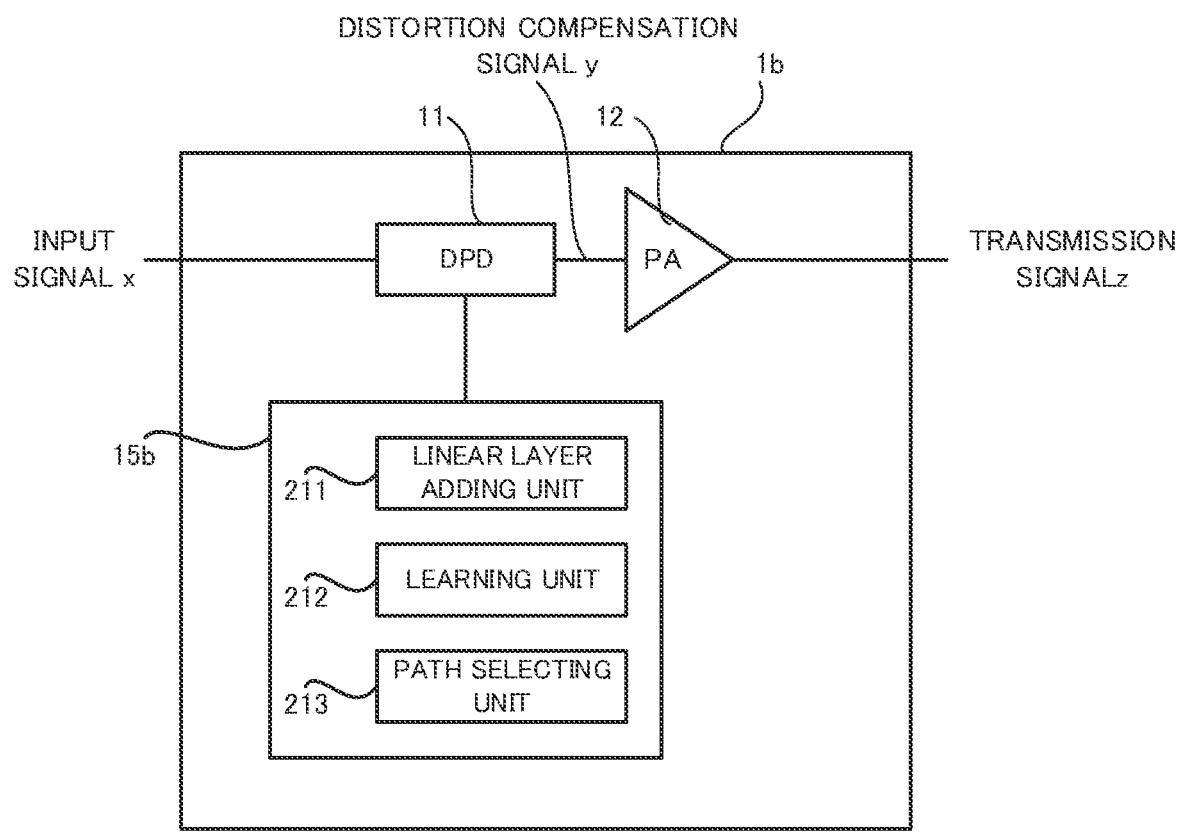
FIG. 10 is a block diagram that illustrates a configuration of a signal transmission apparatus in a second modified example.

Next, with reference to FIG. 10, a signal transmission apparatus 1b in a second modified example will be described. FIG. 10 is a block diagram that illustrates a configuration of the signal transmission apparatus 1b in the second modified example.

As illustrated in FIG. 10, the signal transmission apparatus 1b is different from the signal transmission apparatus 1 in that the function block for determining the parameters of the neural network 112 is realized in the signal transmission apparatus 1b. Specifically, the signal transmission apparatus 1b is provided with a processing apparatus 15b. The processing apparatus 15b reads a computer program. The computer program read by the processing apparatus 15b may be recorded in any recording medium, as with the computer program read by the processing apparatus 21. The processing apparatus 15b executes the read computer program to control the distortion compensation circuit 11 and the power amplifier 12. Especially, the processing apparatus 15b executes the read computer program, the logical function block for determining the parameters of the neural network 112 is realized in the processing apparatus 15b. Specifically, as illustrated in FIG. 10, the function block that is same as the function block realized in the processing apparatus 21 is realized in the processing apparatus 15b. In this case, it can be said that the parameter determination apparatus 2 is implemented in the signal transmission apparatus 1b.

In this case, the signal transmission apparatus 1b itself is capable of updating the parameters of the neural network 112. Thus, the parameters of the neural network 112 can be updated after the signal transmission apparatus 1b is shipped. For example, the parameters of the neural network 112 may be updated (in other word, adjusted) on the basis of an actual usage condition of the signal transmission apparatus 1b when the signal transmission apparatus 1b is installed at an installation site. For example, the parameters of the neural network 112 may be updated on the basis of a characteristic of the transmission signal z that is actually transmitted by the signal transmission apparatus 1b after the signal transmission apparatus 1b starts to operate. For example, the parameters of the neural network 112 may be updated on the basis of a time degradation (namely, a drift) of the signal transmission apparatus 1b after the signal transmission apparatus 1b starts to operate. As a result, even after the signal transmission apparatus 1b is shipped, it is possible to keep a distortion compensation performance of the distortion compensation circuit 11 in a relatively high condition.

Moreover, the signal transmission apparatus 1b is capable of updating the parameters of the neural network 112 by using the sample signal and the label signal that are based on at least one of the input signal x that is actually inputted to the signal transmission apparatus 1b, the distortion compensation signal y that is actually generated by the signal transmission signal 1b and the output signal z that is actually transmitted by the signal transmission signal 1b. Thus, the signal transmission apparatus 1b is capable of updating the parameters of the neural network 112 depending on the actual usage condition of the signal transmission apparatus 1b.

<3-3> Modified Example of Parameter Determination Operation

In the above described description, the learning unit 212 learns the parameters of the network part of the neural network 112_learn that is anterior to the linear layer 1124 at the step S12 in FIG. 4. However, the learning unit 212 may learn the parameters of a network part of the neural network 112_learn that is anterior to the hidden layer $1122_2$ at the step S12 in FIG. 4. The parameters of the network part that is anterior to the hidden layer $1122_2$ may include the weight $w_2$ between the input layer 1121 and the hidden layer $1122_2$, the connecting aspect $CA_2$ between the input layer 1121 and the hidden layer $1122_2$ (namely, the valid path between the input layer 1121 and the hidden layer $1122_2$) and the bias $b_2$ that is added in the hidden layer $1122_2$.

Then, the learning unit 212 may learn the weight w that is used in a network part of the neural network 112_learn between the hidden layer $1122_2$ and the hidden layer $1122_3$ under a constraint condition that the parameters of the network part of the neural network 112_learn that is anterior to the hidden layer $1122_2$ are fixed to the parameters determined at the step S12 at the step S13 in FIG. 4. The weight w that is used in the network part between the hidden layer $1122_2$ and the hidden layer $1122_3$ may include the weight $w_5$ between the hidden layer $1122_2$ and the linear layer 1124 and the weight $w_3$ (actually the weight $w_3'$) between the linear layer 1124 and the hidden layer $1122_3$.

Then, the path selecting unit 213 may select the valid path between the linear layer 1124 and the hidden layer $1122_3$ on the basis of the weight $w_3'$ that is learned by the learning unit 212 with the weight $w_5$ at the step S14 in FIG. 4

Then, the learning unit 212 may learn the parameters in the network part of the neural network 112_learn between the hidden layer $1122_2$ and the hidden layer $1122_3$ under a constraint condition that the parameters of the network part of the neural network 112_learn that is anterior to the hidden layer $1122_2$ are fixed to the parameters determined at the step S12 and the nodes N are not connected through the connecting path that is not selected by the path selecting unit 213 at the step S15 in FIG. 4. The parameters in the network part between the hidden layer $1122_2$ and the hidden layer $1122_3$ may include the weight $w_5$ between the hidden layer $1122_2$ and the linear layer 1124, the weight $w_3$ between the linear layer 1124 and the hidden layer $1122_3$, the connecting aspect $CA_5$ between the hidden layer $1122_2$ and the linear layer 1124 (namely, the valid path between the hidden layer $1122_2$ and the linear layer 1124) and the bias $b_3$ that is added in the hidden layer $1122_3$.

Figure 11:
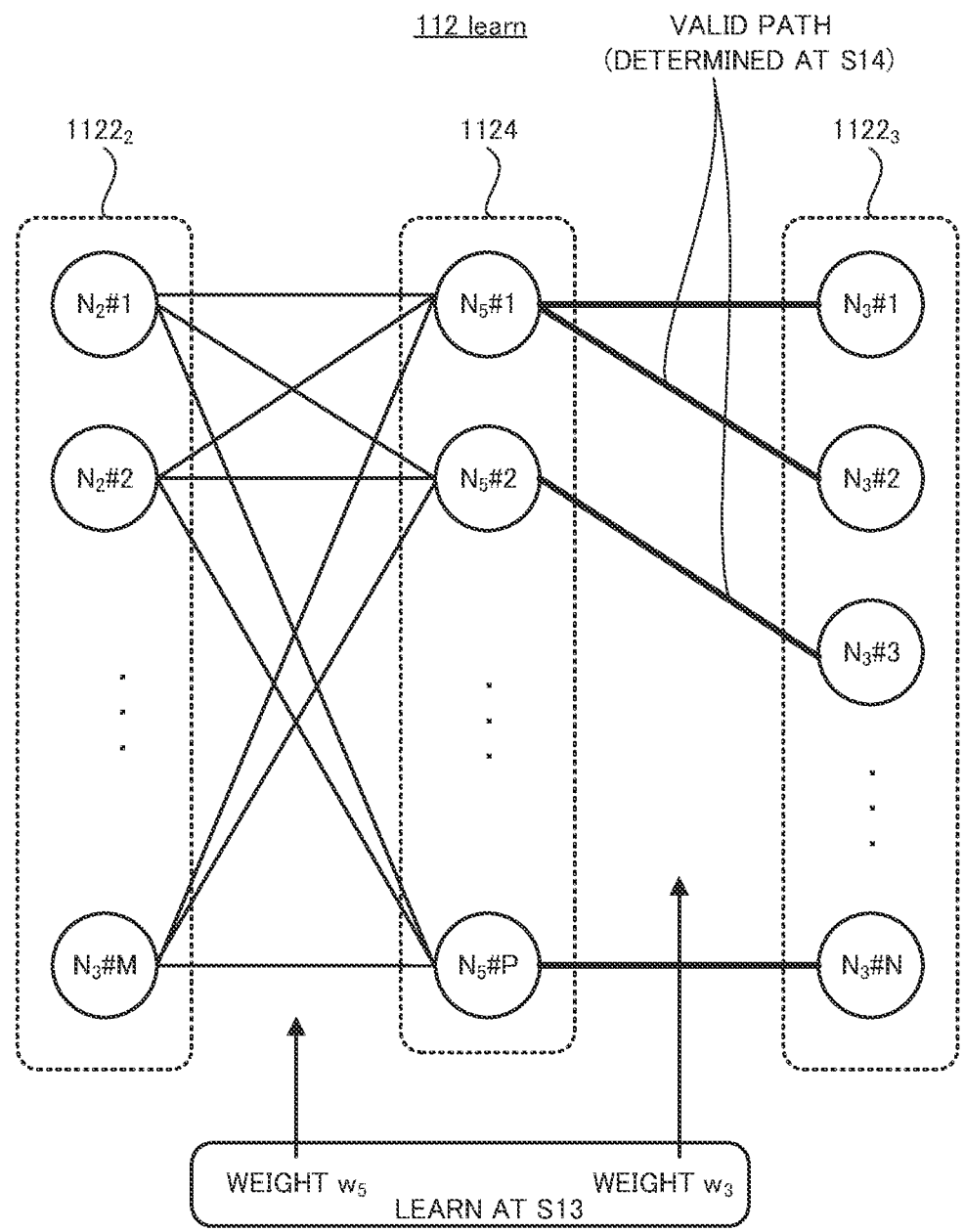
FIG. 11 is a schematic view that illustrates two linear layer and the hidden layer.

As described above, in the modified example, the learning unit 212 learns the parameters (for example, the weight $w_5$) of the network part including the hidden layer $1122_2$ that is anterior to the linear layer 1124 at the same time when the learning unit 212 learns the weight $w_3$ (the weight $w_3$ between the linear layer 1124 and the hidden layer $1122_3$) that is used to select the valid path between the liner layer 1124 and the hidden layer $1122_3$, as illustrated in FIG. 11. In this case, the path selecting unit 213 is capable of selecting the valid path between the liner layer 1124 and the hidden layer $1122_3$ more properly on the basis of the weight $w_3$ learned like this.

<4> Supplementary Note

With respect to the example embodiment described above, the following Supplementary Notes will be further disclosed. The whole or part of the example embodiment described above can be described as, but not limited to, the following Supplementary Notes.

[Supplementary Note 1]

A parameter determination apparatus that determines parameters of a neural network,
the parameter determination apparatus including a controller,
the controller being configured to:
add a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;
learn a weight between the third layer and the second layer as a part of the parameters; and
select, as a part of the parameters, one valid path that is used as a valid connecting path in the neural network for each second node from a plurality of connecting paths that connect the third node and the plurality of second nodes on the basis of the learned weight.

[Supplementary Note 2]

The parameter determination apparatus according to the supplementary note 1, wherein
the third layer includes P third node (wherein, P is a constant number that represents an integer equal to or larger than 1),
the controller is configured to select, as the valid path, one connecting path an absolute value of the weight of which is maximum and not to select, as the valid path, residual P−1 connecting path an absolute value of the weight of which is not maximum, from P connecting path that connects the P third node and one second node of the plurality of second nodes, respectively.

[Supplementary Note 3]

The parameter determination apparatus according to the supplementary note 1 or 2, wherein
the first layer includes M first node (wherein, M is a constant number that represents an integer equal to or larger than 2),
the second layer includes N second node (wherein, N is a constant number that represents an integer equal to or larger than 1),
the third layer includes P third node (wherein, P is a constant number that represents an integer equal to or larger than 1),
such a condition that $P<N\times(M-1)/M$ is satisfied.

[Supplementary Note 4]

The parameter determination apparatus according to any one of the supplementary notes 1 to 3, wherein
the third node is a node in which a bias is not added.

[Supplementary Note 5]

A signal transmission apparatus including:
a distortion compensator that is configured to perform a distortion compensation on an input signal by using a neural network to generate a distortion compensation signal; and
a signal generator that is configured to perform a predetermined operation on the distortion compensation signal to generate a transmission signal that is transmitted to a signal reception apparatus,
the neural network including:
a first layer that is an input layer or a hidden layer;
a second layer that is a hidden layer or an output layer; and
a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer,
an output of single third node being inputted to each of the plurality of second nodes.

[Supplementary Note 6]

The signal transmission apparatus according to the supplementary note 5, wherein
parameters of the neural network is determined by a parameter determination apparatus,
the parameter determination apparatus includes a controller,
the controller is configured to:
add the third layer between the first layer and the second layer as a new layer that constitutes a part of the neural network;

learn a weight between the third layer and the second layer as a part of the parameters; and select, as a part of the parameters, one valid path that is used as a valid connecting path in the neural network for each second node from a plurality of connecting paths that connect the third node and the plurality of second nodes on the basis of the learned weight.

[Supplementary Note 7]

A signal transmission apparatus including:

a distortion compensator that is configured to perform a distortion compensation on an input signal by using a neural network to generate a distortion compensation signal;

a signal generator that is configured to perform a predetermined operation on the distortion compensation signal to generate a transmission signal that is transmitted to a signal reception apparatus; and a controller, the controller being configured to:

add a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;

learn a weight between the third layer and the second layer as a part of parameters of the neural network; and select, as a part of the parameters, one valid path that is used as a valid connecting path in the neural network for each second node from a plurality of connecting paths that connect the third node and the plurality of second nodes on the basis of the learned weight.

[Supplementary Note 8]

A parameter determination method of determining parameters of a neural network, the parameter determination method including:

adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;

learning a weight between the third layer and the second layer as a part of the parameters; and selecting, as a part of the parameters, one valid path that is used as a valid connecting path in the neural network for each second node from a plurality of connecting paths that connect the third node and the plurality of second nodes on the basis of the learned weight.

[Supplementary Note 9]

A signal transmission method including:

performing a distortion compensation on an input signal by using a neural network to generate a distortion compensation signal; and performing a predetermined operation on the distortion compensation signal to generate a transmission signal that is transmitted to a signal reception apparatus, the neural network including:

a first layer that is an input layer or a hidden layer;

a second layer that is a hidden layer or an output layer; and a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer, an output of single third node being inputted to each of the plurality of second nodes.

[Supplementary Note 10]

A signal transmission method including:

performing a distortion compensation on an input signal by using a neural network to generate a distortion compensation signal;

performing a predetermined operation on the distortion compensation signal to generate a transmission signal that is transmitted to a signal reception apparatus;

adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;

learning a weight between the third layer and the second layer as a part of parameters of the neural network; and selecting, as a part of the parameters, one valid path that is used as a valid connecting path in the neural network for each second node from a plurality of connecting paths that connect the third node and the plurality of second nodes on the basis of the learned weight.

[Supplementary Note 11]

A non-transitory program recording medium on which a computer program is recorded, the computer program allowing a computer to execute a parameter determination method of determining parameters of a neural network, the parameter determination method including:

adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;

learning a weight between the third layer and the second layer as a part of the parameters; and selecting, as a part of the parameters, one valid path that is used as a valid connecting path in the neural network for each second node from a plurality of connecting paths that connect the third node and the plurality of second nodes on the basis of the learned weight.

[Supplementary Note 12]

A non-transitory program recording medium on which a computer program is recorded, the computer program allowing a computer to execute a signal transmission method, the signal transmission method including:

performing a distortion compensation on an input signal by using a neural network to generate a distortion compensation signal; and performing a predetermined operation on the distortion compensation signal to generate a transmission signal that is transmitted to a signal reception apparatus, the neural network including:

a first layer that is an input layer or a hidden layer;

a second layer that is a hidden layer or an output layer; and a third layer, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer, an output of single third node being inputted to each of the plurality of second nodes.

[Supplementary Note 13]

A non-transitory program recording medium on which a computer program is recorded, the computer program allowing a computer to execute a signal transmission method, the signal transmission method including:

performing a distortion compensation on an input signal by using a neural network to generate a distortion compensation signal;

performing a predetermined operation on the distortion compensation signal to generate a transmission signal that is transmitted to a signal reception apparatus;

adding a third layer between a first layer and a second layer of the neural network as a new layer that constitutes a part of the neural network, an output of the first layer being inputted to the third layer, an output of the third layer being inputted to the second layer, the third layer including a third node that does not include a non-linear activation function, outputs of a plurality of first nodes of the first layer being inputted to the third node, the number of the third node of the third layer being smaller than the number of a plurality of second nodes of the second layer;

learning a weight between the third layer and the second layer as a part of parameters of the neural network; and selecting, as a part of the parameters, one valid path that is used as a valid connecting path in the neural network for each second node from a plurality of connecting paths that connect the third node and the plurality of second nodes on the basis of the learned weight.

While the invention has been particularly shown and described with reference to the example embodiments thereof, the invention is not limited to the example embodiments. It will be understood by those of ordinary skill in the art that various changes in form and details may be made therein without departing from the spirit and scope of the present invention as defined by the claims. The invention is allowed to be changed, if desired, without departing from the essence or spirit of the invention which can be read from the claims and the entire specification. A parameter determination apparatus, a parameter determination method, a signal transmission apparatus, a signal transmission method, a computer program, a computer program product and a program recording medium, which involve such changes, are also intended to be within the technical scope of the invention.

DESCRIPTION OF REFERENCE NUMERALS 1 signal transmission apparatus
11 distortion compensation circuit
112 neural network
2 parameter determination apparatus
21 processing apparatus
211 linear layer adding unit
212 learning unit
213 path selecting unit

What is claimed is:

1. A parameter determination apparatus configured to determine parameters of a neural network, the parameter determination apparatus comprising:

a controller being configured to:

add a third layer between a first layer and a second layer of the neural network as a new layer that constitutes a part of the neural network, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer;

learn a weight between the third layer and the second layer as a part of the parameters; and select, as a part of the parameters, one valid path that is used as a valid connecting path in the neural network for each second node from a plurality of connecting paths that connect the one or more third nodes and the plurality of second nodes based on the learned weight.

2. The parameter determination apparatus according to claim 1, wherein the third layer includes P number of the one or more third nodes, wherein P is a constant number that represents an integer equal to or larger than one (1), the controller is configured to select, as the valid path, one connecting path a first absolute value of the weight of which is maximum and not to select, as the valid path, residual P-1 connecting path a second absolute value of the weight of which is not maximum, from P connecting path that connects the P number of the one or more third nodes and one second node of the plurality of second nodes, respectively.

3. The parameter determination apparatus according to claim 1, wherein the first layer includes M first node, wherein M is a first constant number that represents an integer equal to or larger than two (2), the second layer includes N second node, wherein N is a second constant number that represents an integer equal to or larger than one (1), the third layer includes P number of the one or more third nodes, wherein P is a third constant number that represents an integer equal to or larger than one (1), and $P < N \times (M-1)/M$ is satisfied.

4. The parameter determination apparatus according to claim 1, wherein the one or more third nodes are nodes in which one or more bias are not respectively added.

5. A signal transmission apparatus comprising:
a distortion compensator configured to perform a distortion compensation on an input signal by using a neural network to generate a distortion compensation signal; and
a signal generator configured to perform a predetermined operation on the distortion compensation signal to generate a transmission signal transmitted to a signal reception apparatus,
wherein the neural network includes:
a first layer that is an input layer or a hidden layer;
a second layer that is a hidden layer or an output layer; and
a third layer, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer, an output of each of the one or more third nodes being inputted to each of the plurality of second nodes.

6. The signal transmission apparatus according to claim 5, wherein
parameters of the neural network is determined by a parameter determination apparatus,
the parameter determination apparatus comprises a controller
configured to:
add the third layer between the first layer and the second layer as a new layer that constitutes a part of the neural network;
learn a weight between the third layer and the second layer as a part of the parameters; and
select, as a part of the parameters, one valid path that is used as a valid connecting path in the neural network for each second node from a plurality of connecting paths that connect the one or more third nodes and the plurality of second nodes based on the learned weight.

7. A parameter determination method of determining parameters of a neural network, the parameter determination method including:
adding a third layer between a first layer and a second layer of the neural network as a new layer that constitutes a part of the neural network, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer;
learning a weight between the third layer and the second layer as a part of the parameters; and
selecting, as a part of the parameters, one valid path that is used as a valid connecting path in the neural network for each second node from a plurality of connecting paths that connect the one or more third nodes and the plurality of second nodes based on the learned weight.

8. A signal transmission method including:
performing a distortion compensation on an input signal by using a neural network to generate a distortion compensation signal; and
performing a predetermined operation on the distortion compensation signal to generate a transmission signal that is transmitted to a signal reception apparatus,
the neural network including:
a first layer that is an input layer or a hidden layer;
a second layer that is a hidden layer or an output layer; and
a third layer, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer, an output of single third node being inputted to each of the plurality of second nodes.

9. A non-transitory program recording medium on which a computer program is recorded,
the computer program allowing a computer to execute a parameter determination method of determining parameters of a neural network,
the parameter determination method including:
adding a third layer between a first layer and a second layer of the neural network as a new layer that constitutes a part of the neural network, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer;
learning a weight between the third layer and the second layer as a part of the parameters; and
selecting, as a part of the parameters, one valid path that is used as a valid connecting path in the neural network for each second node from a plurality of connecting paths that connect the one or more third nodes and the plurality of second nodes based on the learned weight.

10. A non-transitory program recording medium on which a computer program is recorded,
the computer program allowing a computer to execute a signal transmission method,
the signal transmission method including:
performing a distortion compensation on an input signal by using a neural network to generate a distortion compensation signal; and
performing a predetermined operation on the distortion compensation signal to generate a transmission signal that is transmitted to a signal reception apparatus,
the neural network including:
a first layer that is an input layer or a hidden layer;
a second layer that is a hidden layer or an output layer; and
a third layer, an output of the first layer being inputted to the third layer, an output of the third layer being inputted to the second layer, the third layer including one or more third nodes that do not include a non-linear activation function, outputs of a plurality of first nodes of the first layer being inputted to the one or more third nodes, a number of the one or more third nodes of the third layer being smaller than the number of a plurality of second nodes of the second layer, an output of single third node being inputted to each of the plurality of second nodes.

\* \* \* \* \*